United States Patent
Okumura et al.

(10) Patent No.: US 10,497,067 B2
(45) Date of Patent: Dec. 3, 2019

(54) SYSTEM FOR PERFOMING AN EXTRACTION PROCESS ON INPUT DATA CONTAINING XBRL FILES USING A COMBINATION OF EXTRACTION CRITERIA

(71) Applicant: FUJITSU LIMITED, Kawasaki-shi, Kanagawa (JP)

(72) Inventors: Hitoshi Okumura, Yokohama (JP); Takahide Muramoto, Zama (JP); Masaru Uchida, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 280 days.

(21) Appl. No.: 15/680,771

(22) Filed: Aug. 18, 2017

(65) Prior Publication Data
US 2017/0345102 A1 Nov. 30, 2017

Related U.S. Application Data

(63) Continuation of application No. PCT/JP2015/054877, filed on Feb. 20, 2015.

(51) Int. Cl.
*H03M 7/30* (2006.01)
*G06Q 40/00* (2012.01)
(Continued)

(52) U.S. Cl.
CPC ............. *G06Q 40/12* (2013.12); *G06F 16/00* (2019.01); *G06F 16/11* (2019.01); *G06F 17/22* (2013.01);
(Continued)

(58) Field of Classification Search
CPC .......... G06F 16/00; G06F 16/11; G06F 17/22; G06F 17/272; G06F 17/2725;
(Continued)

(56) References Cited

U.S. PATENT DOCUMENTS 8,660,976 B2 * 2/2014 Vasquez Lopez ...... G06F 17/24
706/48
2006/0206518 A1 * 9/2006 Bhatia .................... G06F 16/80
(Continued)

FOREIGN PATENT DOCUMENTS

| JP | 62-40530 | 2/1987 |
| JP | 3-52068 | 3/1991 |

(Continued)

OTHER PUBLICATIONS

International Search Report dated Apr. 28, 2015 in corresponding International Patent Application No. PCT/JP2015/054877.
(Continued)

*Primary Examiner* — Cesar B Paula
*Assistant Examiner* — Luu-Phuong T Nguyen

(57) ABSTRACT

An extraction apparatus includes an input-data analysis unit that, when an extraction process is performed on input data containing a plurality of XBRL files using a combination of a plurality of extraction criteria, each of the extraction criteria directly specifying an element and an aspect of each of the plurality of XBRL files, calculates, from the input data, distribution information containing distribution of values of individual aspects of a plurality of elements that are individually provided by the plurality of XBRL files, and an application-sequence determining unit that determines an application sequence of the plurality of extraction criteria by referring to the calculated distribution information. Hence, the extraction apparatus can extract XBRL data pieces containing data items to be validated against a validation rule from the input data rapidly.

5 Claims, 16 Drawing Sheets

(51) Int. Cl.
  *G06F 16/11* (2019.01)
  *G06F 17/22* (2006.01)
  *G06Q 10/00* (2012.01)
  *G06F 17/27* (2006.01)
  *G06F 16/00* (2019.01)

(52) U.S. Cl.
  CPC ........ *G06F 17/272* (2013.01); *G06F 17/2725* (2013.01); *G06Q 10/00* (2013.01); *G06F 17/2247* (2013.01)

(58) Field of Classification Search
  CPC .... G06F 17/2247; G06Q 10/00; G06Q 40/12; H03M 7/30
  USPC ........................................................ 715/237
  See application file for complete search history.

(56) References Cited

U.S. PATENT DOCUMENTS

| | | | |
|---|---|---|---|
| 2009/0249186 A1* | 10/2009 | Fetzer | G06F 17/2247 715/234 |
| 2012/0278694 A1 | 11/2012 | Washio | |
| 2015/0161193 A1* | 6/2015 | Damodar | G06F 16/2365 707/694 |

FOREIGN PATENT DOCUMENTS

| | | |
|---|---|---|
| JP | 10-105560 | 4/1998 |
| JP | 2006-163876 | 6/2006 |
| JP | 2008-299797 | 12/2008 |
| JP | 2013003981 | 1/2013 |
| WO | WO 2005/009237 A1 | 2/2005 |
| WO | WO 2011/089683 A1 | 7/2011 |

OTHER PUBLICATIONS

Written Opinion of the International Search Authority dated Apr. 28, 2015 in corresponding International Patent Application No. PCT/JP2015/054877.

Extended European Search Report, dated Jul. 20, 2018, in European Application No. 15882652.9 (10 pp.).

Notification of Reasons for Refusal, dated Nov. 13, 2018, in Japanese Application No. 2017500259 (5 pp.).

* cited by examiner

FIG.3

| TYPE | EXAMPLE |
|---|---|
| Location | PARENT ELEMENT INFORMATION |
| Concept | ELEMENT NAME |
| Entity identifier | COMPANY INFORMATION |
| Period | FISCAL YEAR |
| Unit | UNIT INFORMATION |
| Complete segment | SUPPLEMENTARY INFORMATION |
| Complete scenario | SUPPLEMENTARY INFORMATION |
| Non-XDT segment | SUPPLEMENTARY INFORMATION |
| Non-XDT scenario | SUPPLEMENTARY INFORMATION |
| Dimension (WITH ASPECTS ON PER-"AXIS" BASIS) | SUPPLEMENTARY INFORMATION |

FIG.4

| ASPECT | VALUE | DISTRIBUTION INFORMATION |
|---|---|---|
| DIMENSION AXIS(dim:D1) | m:m10 | 290271 |
| | m:m11 | 46 |
| | m:m12 | 46 |
| DIMENSION AXIS(dim:D2) | m:m20 | 29905 |
| | m:m21 | 69 |
| | m:m22 | 3 |
| | m:m23 | 1 |
| | m:m23 | 260406 |
| DIMENSION AXIS(dim:D3) | m:m30 | 290384 |
| DIMENSION AXIS(dim:D4) | ... | ... |
| ... | | |

FIG.5

EXAMPLE OF STATIC EXTRACTION CRITERION
*EXAMPLE OF CRITERION FOR EXTRACTING Dimension (Explicit AXIS)

```
<df:explicitDimension>
    <df:dimension><df:qname>dim:D1</df:qname></df:dimension>
    <df:member><df:qname>mem:m10</df:qname></df:member>
</df:explicitDimension>
```

EXAMPLE OF DYNAMIC EXTRACTION CRITERION
*EXAMPLE OF CRITERION FOR EXTRACTING Dimension (Explicit AXIS)

```
<df:explicitDimension>
    <df:dimension><df:qnameExpression>
      if ( . > 0 ) then  QName('http://sample','dim:D1') else   QName('http://sample','dim:D2')
    </df:qnameExpression></df:dimension>
    <df:member><df:qnameExpression>
      if ( . > 0 ) then  QName('http://sample','mem:m10') else   QName('http://sample','mem:,m20')
    </df:qnameExpression></df:member>
</df:explicitDimension>
```

US 10,497,067 B2

SYSTEM FOR PERFOMING AN EXTRACTION PROCESS ON INPUT DATA CONTAINING XBRL FILES USING A COMBINATION OF EXTRACTION CRITERIA

CROSS-REFERENCE TO RELATED APPLICATION

This application is a continuation application of International Application PCT/JP2015/054877, filed on Feb. 20, 2015, and designating the U.S., the entire contents of which are incorporated herein by reference.

FIELD

The present invention relates to extraction programs and the like.

BACKGROUND

It is mandated to submit financial statements in a form of an XBRL (eXtensible Business Reporting Language) document to the financial services agency. XBRL is an XML (eXtensible Markup Language)-based language providing a standard so that various types of financial reporting information can be generated, circulated, and utilized. An XBRL document is, for instance, a document about a financial accounting report described in XBRL.

XBRL data used in generating an XBRL document is not always of high quality. XBRL data that is input is typically subjected to, in addition to validation in terms of XML or XBRL syntax and format validity, validation based on financial implications and consistency of data items. The validation based on financial implications and consistency of data items can be regarded as validation serving to support an auditing function. XBRL formula is provided as a technique that can be utilized in performing such validation. XBRL formula is a description language that defines rules for performing validation and calculation on XBRL data content. Specifically, a validation process validates input XBRL data against a plurality of validation rules described in XBRL formula.

For instance, audit regulatory agencies or the like may receive XBRL data from a general business cooperation and perform an audit. A validation process checks quality of XBRL data, which is regularly input, against validation rules described in XBRL formula. Thereafter, data processing is performed on the checked XBRL data. The audit is desirably completed within a certain period.

Patent Literature 1: International Publication Pamphlet No. WO 2011/089683

However, the number of pieces of input XBRL data is in an increasing trend. Hence, a validation process based on validation rules described in XBRL formula tends to be time consuming. Data items to be validated against an individual validation rule often make up only a small portion of all input XBRL data pieces. For an individual validation rule, it is desirable that XBRL data pieces containing data items to be validated against the validation rule are extracted rapidly.

SUMMARY

According to an aspect of an embodiment, a non-transitory computer-readable recording medium has stored therein an extraction program. The program causes a computer to execute a process. The process includes, when performing an extraction process on input data containing a plurality of XBRL files using a combination of a plurality of extraction criteria, each of the extraction criteria directly specifying an element and an aspect of each of the plurality of XBRL files, determining an application sequence of the plurality of extraction criteria by referring to distribution information containing distribution of values of individual aspects of a plurality of elements that are individually provided by the plurality of XBRL files.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of aspect types.

FIG. 4 is a diagram illustrating an example of a result of analysis conducted by an input-data analysis unit according to the first embodiment.

FIG. 5 is a diagram illustrating an example of extraction criteria acquired by an extraction-criteria acquisition unit according to the first embodiment.

DESCRIPTION OF EMBODIMENTS

Embodiments of extraction programs, extraction apparatuses, and extraction methods disclosed in the present application are described in detail below with reference to the drawings. The embodiments are not intended to limit the invention in any way.

First Embodiment

[Configuration of Extraction Apparatus According to First Embodiment]

Figure 1:
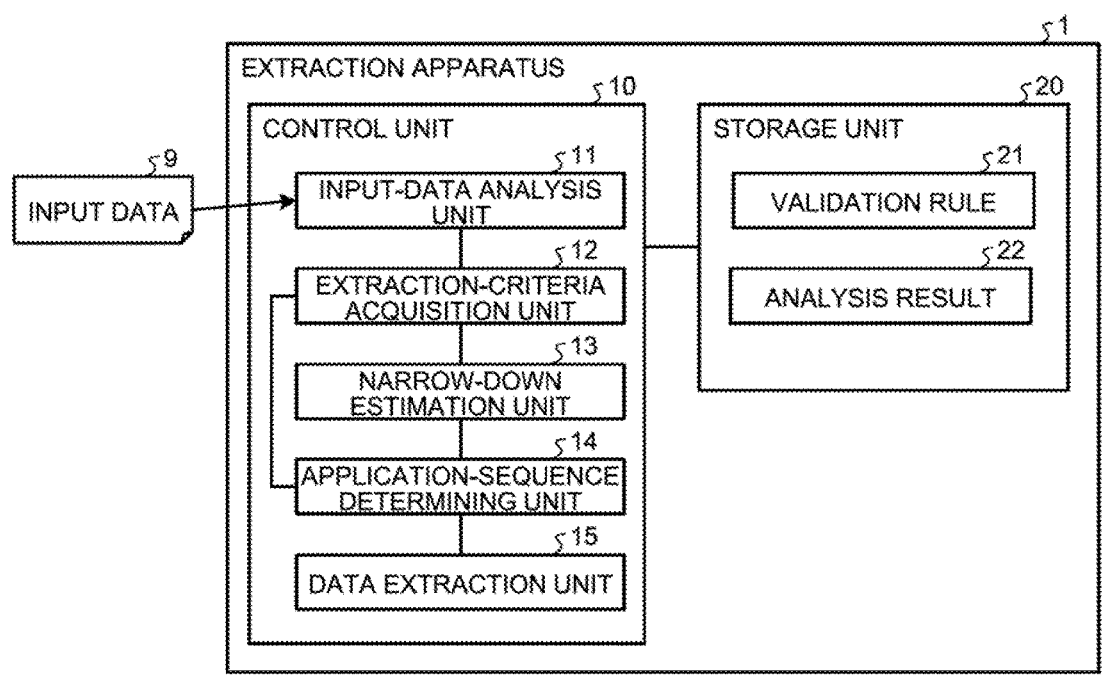
FIG. 1 is a functional block diagram illustrating a configuration of an extraction apparatus according to a first embodiment.

FIG. 1 is a functional block diagram illustrating a configuration of an extraction apparatus according to a first embodiment. The extraction apparatus according to the first embodiment extracts XBRL data pieces containing data items to be validated from a plurality of XBRL data pieces contained in input data 9 using extraction criteria specified by a validation rule. The extracted XBRL data pieces are validated using the validation rule.

The "XBRL data" denoted above is data described in XBRL. XBRL is an XML-based language providing a standard so that various types of financial reporting information can be generated, circulated, and utilized. An example of the XBRL data is financial data. An XBRL data piece includes a value and various information, which is referred to as "aspect", supplementing the value. The aspect contains an element name of the value and various additional information. Hereinafter, XBRL data, which is data described in XBRL and containing data items, is used as synonymous with data items. Aspect information will be described below.

The "validation rule" denoted above is a rule for performing validation and calculation on XBRL data content and described using XBRL formula. XBRL formula, which is a description language that defines rules for performing validation and calculation on XBRL data content, defines validation rules. Details of a configuration of the validation rule will be described below.

As illustrated in FIG. 1, an extraction apparatus 1 includes a control unit 10 and a storage unit 20.

The storage unit 20 may correspond to, for instance, a storage device, such as a non-volatile semiconductor memory device, e.g., a flash memory or a ferroelectric random access memory (FRAM) (registered trademark). The storage unit 20 includes a validation rule 21 and an analysis result 22.

Figure 2:
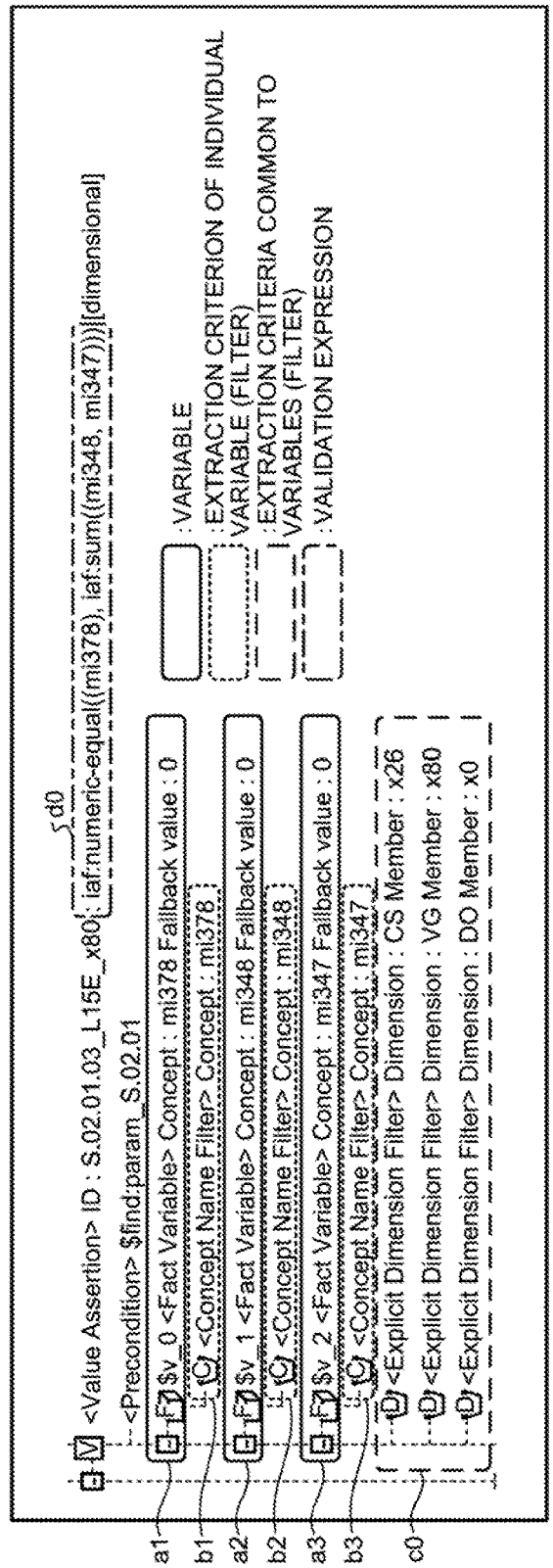
FIG. 2 is a diagram illustrating an example of a validation rule configuration.

The validation rule 21 is a rule for performing validation or calculation on XBRL data content. A configuration of the validation rule 21 is described below with reference to FIG. 2. FIG. 2 is a diagram illustrating an example of a validation rule configuration.

As illustrated in FIG. 2, for instance, "variable", "extraction criterion of individual variable", "extraction criteria common to variables" and "validation expression" are defined in the validation rule. The "extraction criteria common to variables" are extraction criteria common to variables defined by all the "extraction criteria for individual variables" in the validation rule. In this example, the "variable" corresponds to a1, a2, and a3. The "extraction criterion of individual variable" corresponds to b1, b2, and b3. The "extraction criteria common to variables" corresponds to c0. The "validation expression" corresponds to d0.

The "extraction criteria common to variables" c0 narrow down the whole input data 9 to a portion of the input data 9 containing data items to be validated against the validation rule. Furthermore, for the "variable" a1, the narrowed-down portion of the input data 9 using c0 is further narrowed down using the "extraction criterion of individual variable" b1 to a portion of the input data 9 containing a data item to be validated against the validation rule, and assigned to the "variable" a1. Similarly, for the "variable" a2, the narrowed-down portion of the input data 9 using c0 is further narrowed down using the "extraction criterion of individual variable" b2 to a portion of the input data 9 containing a data item to be validated against the validation rule, and assigned to the "variable" a2. Similarly, for the "variable" a3, the narrowed-down portion of the input data 9 using c0 is further narrowed down using the "extraction criterion of individual variable" b3 to a portion of the input data 9 containing a data item to be validated against the validation rule, and assigned to the "variable" a3. Whether the "validation expression" d0 is satisfied with the assigned data item is validated. In the example of FIG. 2, an aspect, which is the first criterion specification of the "extraction criteria common to variables" c0, is "Dimension:CS", and its value is "x26". An aspect, which is the second criterion specification of the same, is "Dimension:VG", and its value is "x80". An aspect, which is the third criterion specification of the same, is "Dimension:D0", and its value is "x0". Each of "Dimension:CS", "Dimension:VG", and "Dimension:D0" is an aspect. Each of "Member:x26", "Member:x80", "Member:x0" is a value of its corresponding aspect.

Aspect types are described below with reference to FIG. 3. FIG. 3 is a diagram illustrating an example of aspect types. As illustrated in FIG. 3, there are various types of aspects. Examples of the aspect types include "Location", "Concept", and "Dimension". "Location" is an aspect indicating information about a parent element. "Concept" is an aspect indicating an element name. "Dimension" is an aspect indicating supplementary information representing an axis. "Dimension" has aspect types on a per-axis basis. There are two types of Dimension axes, which are explicit axis and typed axis. A desired number of axes are defined for each axis type.

Referring back to FIG. 1, the analysis result 22 is a result of analyzing the input data 9. Specifically, the analysis result 22 is distribution indicating, by the numbers of pieces of the input data 9, frequencies of occurrences of individual values associated with an aspect type for each of the aspect types. The analysis result 22 is analyzed in advance by an input-data analysis unit 11 and stored in the storage unit 20.

The control unit 10 includes an internal memory for storing programs defining various process procedures and control data and executes various processing using the programs and the control data. The control unit 10 corresponds to, for instance, an integrated electronic circuit, such as an application specific integrated circuit (ASIC) or a field programmable gate array (FPGA). The control unit 10 may alternatively correspond to an electronic circuit, such as a central processing unit (CPU) or a micro processing unit (MPU). The control unit 10 includes the input-data analysis unit 11, an extraction-criteria acquisition unit 12, a narrow-down estimation unit 13, an application-sequence determining unit 14, and a data extraction unit 15.

The input-data analysis unit 11 analyzes the input data 9. For instance, the input-data analysis unit 11 calculates, from the input data 9, frequencies of occurrences of individual values associated with an aspect for each of the various types of aspects. The input-data analysis unit 11 stores the calculated frequencies of occurrences in the analysis result 22 of the storage unit 20. The input-data analysis unit 11 may analyze all the aspect types; alternatively, the input-data analysis unit 11 may analyze only aspect types specified by extraction criteria of the validation rule. This is because there will be no chance to make use of an analysis result of an aspect type that is not defined in extraction criteria of the validation rule.

The analysis result 22 obtained by the input-data analysis unit 11 is described below with reference to FIG. 4. FIG. 4 is a diagram illustrating an example of a result of analysis conducted by the input-data analysis unit according to the first embodiment. As illustrated in FIG. 4, the analysis result 22 contains an aspect 22a, a value 22b, and distribution information 22c. The aspect 22a indicates an aspect type. The value 22b indicates a value associated with the aspect type. The distribution information 22c is distribution information indicating frequency of occurrence of the value 22b by the number of pieces of the input data 9. Specifically, the distribution information 22c indicates the number of pieces of the input data 9 having the value 22b of the aspect 22a or, in other words, frequency of occurrence of the value 22b.

As an example, an analysis result of a situation where the aspect type is "Dimension" is discussed below. When the aspect 22a is "Dimension Axis (dim:D1)" and the value 22b is "m:m10", the distribution information 22c is "290271". When the aspect 22a is "Dimension Axis (dim:D1)" and the value 22b is "m:m11", the distribution information 22c is "46". When the aspect 22a is "Dimension Axis (dim:D2)" and the value 22b is "m:m20", the distribution information 22c is "29905". When the aspect 22a is "Dimension Axis (dim:D3)" and the value 22b is "m:m30", the distribution information 22c is "290384".

The extraction-criteria acquisition unit 12 acquires static extraction criteria and dynamic extraction criteria from an extraction-criteria analysis result. The extraction-criteria analysis result, which is a result of analyzing extraction criteria in the validation rule, contains static extraction criteria and dynamic extraction criteria. Specifically, the extraction criteria described in the validation rule are defined independent of the input data 9, and therefore the extraction criteria are analyzed in advance of when the input data 9 is input. A static extraction criterion is an extraction criterion that directly specifies an aspect type and a value that are described in each XBRL data piece. Specifically, a static extraction criterion, which is independent of an XBRL data piece such that a condition for fulfilling the criterion is originally determined, is a criterion that teaches an aspect type to be extracted and its aspect value in advance. A dynamic extraction criterion is an extraction criterion that dynamically specifies an aspect type and its value that are described in each XBRL data piece. Specifically, a dynamic extraction criterion, which is dependent on an XBRL data piece to be extracted such that a condition for fulfilling the criterion depends on the XBRL data piece, is a criterion that does not teach an aspect type to be extracted and its aspect value in advance.

For instance, the extraction-criteria acquisition unit 12 acquires static extraction criteria from an extraction-criteria analysis result. Specifically, from extraction criteria common to variables described in the validation rule, static extraction criteria are acquired. The extraction-criteria acquisition unit 12 also acquires dynamic extraction criteria from the extraction-criteria analysis result. Specifically, from the extraction criteria common to variables described in the validation rule, dynamic extraction criteria are acquired. The extraction criteria acquired by the extraction-criteria acquisition unit 12 are described below with reference to FIG. 5. FIG. 5 is a diagram illustrating an example of extraction criteria acquired by the extraction-criteria acquisition unit according to the first embodiment.

As illustrated in FIG. 5, the upper part is an example of a static extraction criterion. This is a static extraction criterion whose aspect type is "Dimension". In the extraction criterion of this example, "Dimension (dim:D1)" is directly specified as an aspect type, and "mem:m10" is directly specified as its value. Specifically, this is a static extraction criterion that teaches an aspect type to be extracted and its aspect value in advance.

The lower part is an example of a dynamic extraction criterion. This is an example of a dynamic extraction criterion whose aspect type is "Dimension". The extraction criterion of this example is set such that when a value of an XBRL data piece is positive (>0), "Dimension (dim:D1)" is applied as an aspect type, and "mem:m10" is applied as its value. The extraction criterion is set such that when the value of an XBRL data piece is smaller than or equal to 0 (≤0), "Dimension (dim:D2)" is applied as an aspect type, and "mem:m20" is applied as its value. Specifically, this is a dynamic extraction criterion, which applies a to-be-checked criterion that depends on an XBRL data piece, that does not teach an aspect type to be extracted and its aspect value in advance.

Referring back to FIG. 1, the narrow-down estimation unit 13 acquires frequency of occurrence for each of the static extraction criteria acquired by the extraction-criteria acquisition unit 12 from the analysis result 22. Specifically, the narrow-down estimation unit 13 estimates the number (hereinafter, "estimated narrowed-down count") of XBRL data pieces achievable by narrowing down (extraction) using a static extraction criterion for each of the static extraction criteria. For instance, the narrow-down estimation unit 13 retrieves an aspect and a value to be checked against XBRL data pieces from a static extraction criterion acquired by the extraction-criteria acquisition unit 12. The narrow-down estimation unit 13 reads out the distribution information 22c associated with the retrieved aspect and value from the analysis result 22, and sets the read-out distribution information 22c as an estimated narrowed-down count associated with the aspect and value. A narrowing effect of an extraction criterion increases with an increase in the estimated narrowed-down count of the extraction criterion.

The application-sequence determining unit 14 determines an application sequence of the plurality of static extraction criteria based on estimated narrowed-down counts that are individually estimated by the narrow-down estimation unit 13 for each of the plurality of static extraction criteria. For instance, the application-sequence determining unit 14 determines, by referring to the estimated narrowed-down counts of the plurality of static extraction criteria estimated by the narrow-down estimation unit 13, an application sequence of the static extraction criteria such that the smaller the estimated narrowed-down count of a static extraction criterion, the earlier the static extraction criterion is applied. In other words, the application-sequence determining unit 14 determines the application sequence of the extraction criteria in a descending order of magnitude of narrowing effect. Hence, the application-sequence determining unit 14 determines the application sequence such that an extraction criterion exhibiting a highest narrowing effect is applied first. When dynamic extraction criteria have been acquired by the extraction-criteria acquisition unit 12, the application-sequence determining unit 14 may preferably determine an application sequence such that, for instance, the dynamic extraction criteria are applied after all the static extraction criteria are applied. Specifically, the application-sequence determining unit 14 may preferably determine the sequence such that the sequence can narrow down XBRL data pieces to some extent and thereafter further narrow down the XBRL data pieces using the dynamic extraction criteria. This is because determination as to whether XBRL data pieces fulfill a dynamic extraction criterion entails checking all the XBRL data pieces against the criterion and, accordingly, increases load of a determination process. Hence, the application-sequence determining unit 14 may preferably determine the sequence such that the sequence narrows down XBRL data pieces to some extent and thereafter further narrows down the XBRL data pieces using the dynamic extraction criteria.

The data extraction unit 15 extracts XBRL data pieces by applying the extraction criteria to the input data 9 using the application sequence determined by the application-sequence determining unit 14. The data extraction unit 15 can thus extract XBRL data pieces containing data items pertinent to the validation rule from the input data rapidly.

Figure 6:
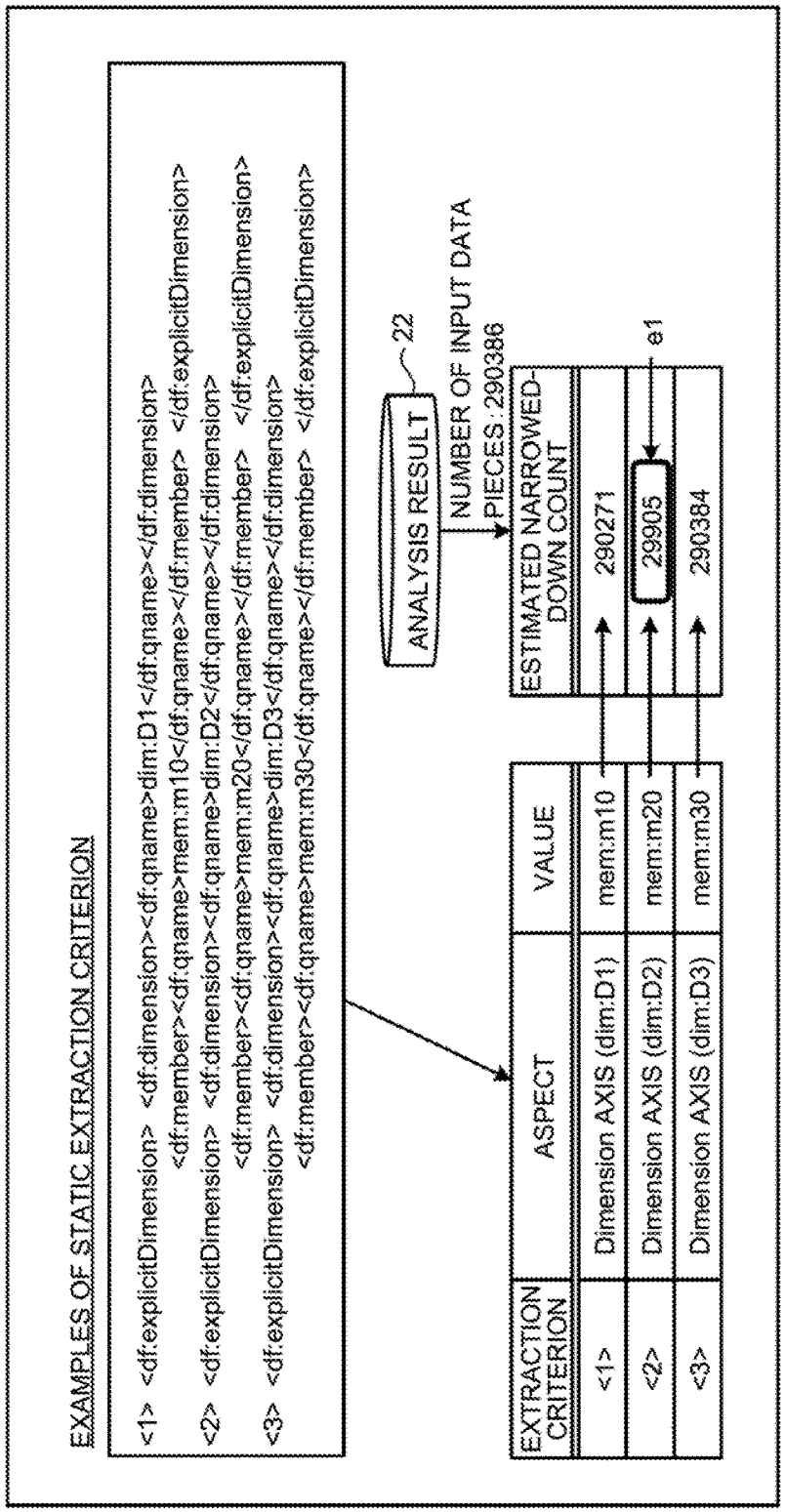
FIG. 6 is a diagram illustrating a specific example of processing performed by a narrow-down estimation unit according to the first embodiment.

Next, processing performed by the narrow-down estimation unit 13 is described with reference to FIG. 6. FIG. 6 is a diagram illustrating a specific example of processing performed by the narrow-down estimation unit according to the first embodiment. It is assumed in FIG. 6 that the extraction-criteria acquisition unit 12 has acquired static extraction criteria.

As illustrated in FIG. 6, the narrow-down estimation unit 13 retrieves aspects and values to be checked against XBRL data pieces from the static extraction criteria. In this example, from a static extraction criterion <1>, "Dimension Axis (dim:D1)" is retrieved as an aspect, and "mem:m10" is retrieved as its value. From a static extraction criterion <2>, "Dimension Axis (dim:D2)" is retrieved as an aspect, and "mem:m20" is retrieved as its value. From a static extraction criterion <3>, "Dimension Axis (dim:D3)" is retrieved as an aspect, and "mem:m30" is retrieved as its value.

The narrow-down estimation unit 13 reads out the distribution information 22c associated with the retrieved aspects and values from the analysis result 22 and sets the distribution information 22c as estimated narrowed-down counts associated with the aspects and values. In this example, as an estimated narrowed-down count associated with "Dimension Axis (dim:D1)" and "mem:m10", "290271" is set. Narrowing down to "290271" XBRL data pieces is estimated. As an estimated narrowed-down count associated with "Dimension Axis (dim:D2)" and "mem:m20", "29905" is set. Narrowing down to "29905" XBRL data pieces is estimated. As an estimated narrowed-down count associated with "Dimension Axis (dim:D3)" and "mem:m30", "290384" is set. Narrowing down to "290384" XBRL data pieces is estimated. Hence, it is indicated that "29905" indicated by reference characters e1 is the smallest estimated narrowed-down count, and its extraction criterion exhibits a great narrowing effect.

Figure 7:
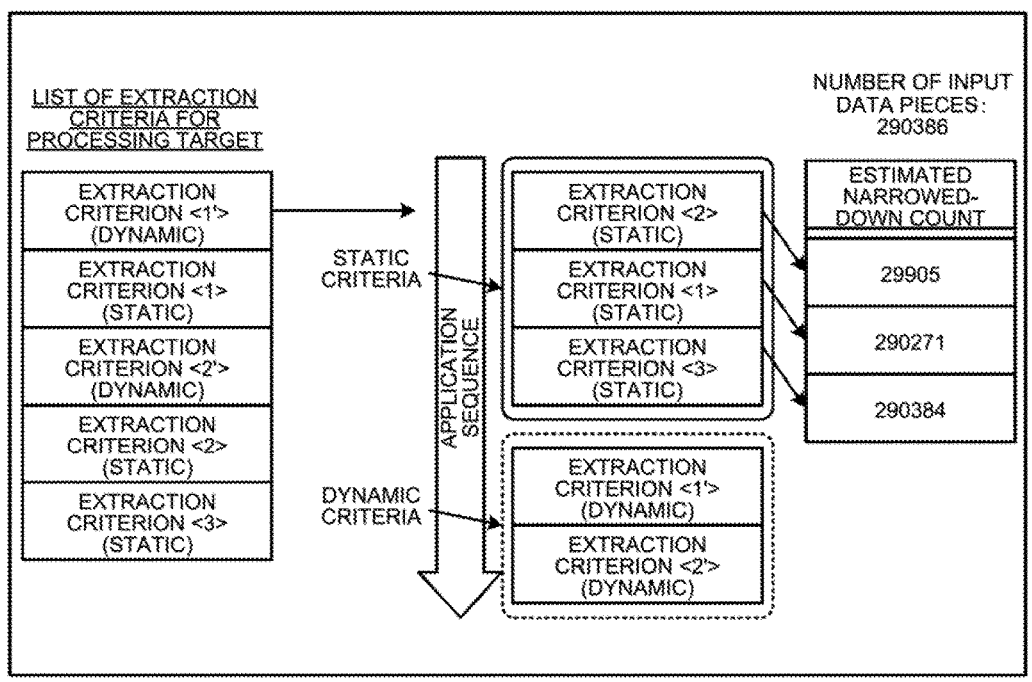
FIG. 7 is a diagram illustrating a specific example of processing performed by an application-sequence determining unit according to the first embodiment.

Next, processing performed by the application-sequence determining unit 14 is described with reference to FIG. 7. FIG. 7 is a diagram illustrating a specific example of processing performed by the application-sequence determining unit according to the first embodiment. It is assumed in FIG. 7 that the extraction-criteria acquisition unit 12 has acquired the static extraction criteria (static criteria) <1>, <2>, and <3> and dynamic extraction criteria (dynamic criteria) <1'> and <2'>. It is further assumed that the narrow-down estimation unit 13 has set estimated narrowed-down counts of the static criteria.

As illustrated in FIG. 7, the application-sequence determining unit 14 determines, by referring to the estimated narrowed-down counts of the plurality of static criteria, an application sequence of the static criteria such that the smaller the estimated narrowed-down count of a static criterion, the earlier the static extraction is applied. In this example, the estimated narrowed-down count of the static criterion <1> is "290271"; the estimated narrowed-down count of the static criterion <2> is "29905"; and the estimated narrowed-down count of the static criterion <3> is "290384". Hence, the application sequence of the static criteria is determined as (<2>, <1>, <3>).

Because the dynamic extraction criteria have been acquired by the extraction-criteria acquisition unit 12, the application-sequence determining unit 14 determines an application sequence of the dynamic criteria such that, for instance, the dynamic criteria are applied after all the static criteria are applied. In this example, an application sequence of the dynamic criteria is determined as (<1'>, <2'>) that follows after all the static criteria. The application sequence of the dynamic criteria may be either rearranged or not rearranged.

Hence, by applying processing performed by the application-sequence determining unit 14, a total number of input data pieces that are input to the static extraction criteria can be minimized as follows. The number of data pieces input to the static criterion <2> is "290386"; the number of data pieces input to the static criterion <1> is "29905"; and the number of data pieces input to the static criterion <3> is "29905" (worst case). Hence, a total number of the input data pieces is "350196". Specifically, when the number of data pieces input to each of the static criteria is "290386", a total number of the input data pieces is "871158". Thus, by applying processing performed by the application-sequence determining unit 14, the total number of the input data pieces can be reduced to be smaller than or equal to a half of the total number of the input data pieces of the case where the number of data pieces input to each of the static criteria is "290386".

[Procedure for Extraction Process]

Figure 8:
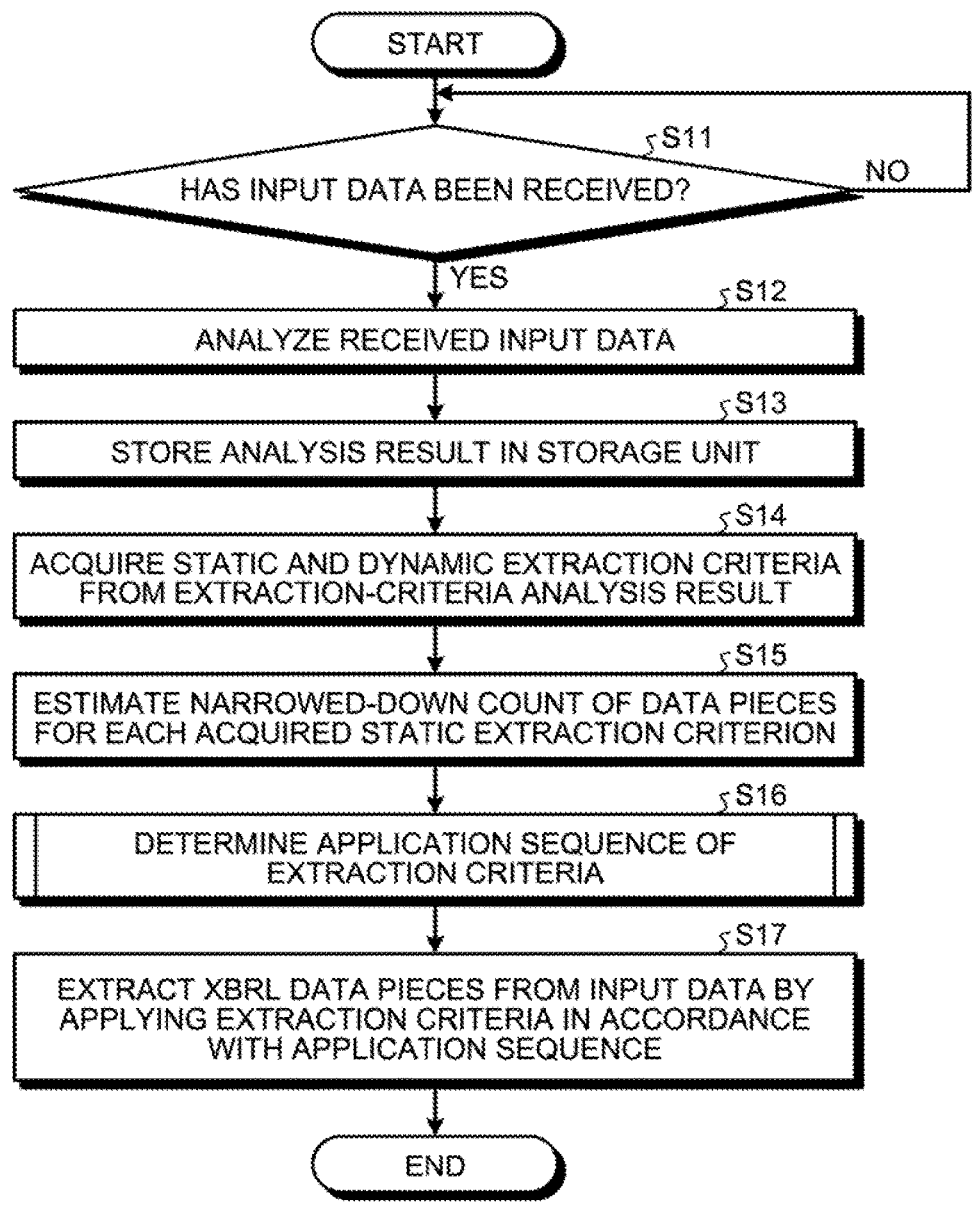
FIG. 8 is a diagram illustrating an example of a flowchart for an extraction process according to the first embodiment.

Next, a procedure for an extraction process according to the first embodiment is described below with reference to FIG. 8. FIG. 8 is a diagram illustrating an example of a flowchart for the extraction process according to the first embodiment. It is assumed that an extraction-criteria analysis result is stored in the storage unit 20 in advance of receiving the input data 9.

First, the input-data analysis unit 11 determines whether the input data 9 has been received (Step S11). Upon determining that the input data 9 has not been received (No at Step S11), the input-data analysis unit 11 iterates the determination process until the input data 9 is received.

On the other hand, upon determining that the input data 9 has been received (Yes at Step S11), the input-data analysis unit 11 analyzes the received input data 9 (Step S12). For instance, the input-data analysis unit 11 calculates, from the input data 9, frequencies of occurrences of individual values associated with an aspect for each of various types of aspects. The input-data analysis unit 11 stores the frequencies of occurrences of the individual values associated with an aspect calculated for each of the aspects as an analysis result in the analysis result 22 in the storage unit 20 (Step S13).

Thereafter, the extraction-criteria acquisition unit 12 acquires static extraction criteria and dynamic extraction criteria from the extraction-criteria analysis result (Step S14).

The narrow-down estimation unit 13 estimates a narrowed-down count of XBRL data pieces for each of the acquired static extraction criteria (Step S15). For instance, the narrow-down estimation unit 13 retrieves an aspect and a value to be checked against the XBRL data pieces from an acquired static extraction criterion. The narrow-down estimation unit 13 reads out the distribution information $22c$ associated with the retrieved aspect and value from the analysis result 22. The narrow-down estimation unit 13 sets the distribution information $22c$ as an estimated narrowed-down count associated with the aspect and value.

Thereafter, the application-sequence determining unit 14 determines an application sequence of the acquired static extraction criteria and dynamic extraction criteria (Step S16). A procedure for an application-sequence determining process will be described below.

The data extraction unit 15 extracts XBRL data pieces from the input data 9 by applying the extraction criteria to the input data 9 in accordance with the determined application sequence (Step S17). The data extraction unit 15 can thus extract XBRL data pieces containing data items pertinent to the validation rule from the input data 9 rapidly.

[Procedure for Application-Sequence Determining Process]

Figure 9:
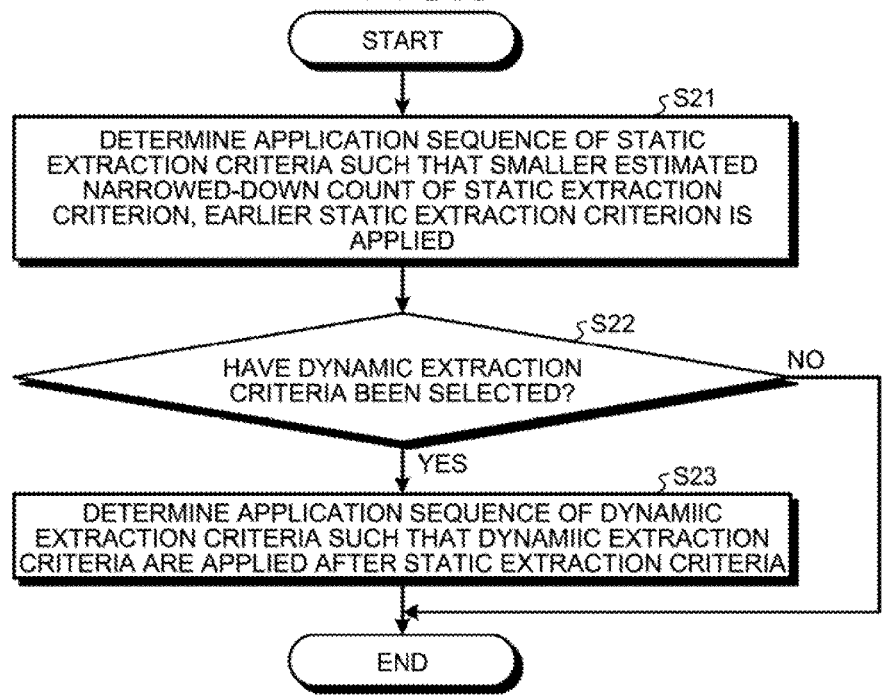
FIG. 9 is a diagram illustrating an example of a flowchart for an application-sequence determining process according to the first embodiment.

Next, a procedure for the application-sequence determining process according to the first embodiment is described below with reference to FIG. 9. FIG. 9 is a diagram illustrating an example of a flowchart for the application-sequence determining process according to the first embodiment.

The application-sequence determining unit 14 determines an application sequence of the static extraction criteria such that the smaller the estimated narrowed-down count of a static extraction criterion, the earlier the static extraction criterion is applied (Step S21). For instance, the application-sequence determining unit 14 determines, by referring to the estimated narrowed-down counts of the plurality of static extraction criteria estimated by the narrow-down estimation unit 13, a static extraction sequence such that the smaller the estimated narrowed-down count of a static extraction criterion, the earlier the static extraction criterion is applied. In other words, the application-sequence determining unit 14 determines the application sequence of the extraction criteria in a descending order of magnitude of narrowing effect.

The application-sequence determining unit 14 determines whether the extraction-criteria acquisition unit 12 has acquired dynamic extraction criteria (Step S22). Upon determining that dynamic extraction criteria have been acquired (Yes at Step S22), the application-sequence determining unit 14 determines an application sequence of the dynamic extraction criteria such that the dynamic extraction criteria are applied after the static extraction criteria are applied (Step S23). The application-sequence determining unit 14 completes the process.

On the other hand, upon determining that dynamic extraction criteria have not been acquired (No at Step S22), because the application sequence of the static extraction criteria has been determined, the application-sequence determining unit 14 completes the process.

[Advantageous Effects of First Embodiment]

According to the first embodiment, the extraction apparatus 1 performs, on the input data 9 containing a plurality of XBRL data pieces, an extraction process using a combination of a plurality of extraction criteria, each of the extraction criteria directly specifying an element and an aspect of each of the plurality of XBRL data pieces. In the extraction process, the extraction apparatus 1 determines an application sequence of the plurality of extraction criteria by referring to distribution information containing distribution of values of individual aspects of a plurality of elements that are individually provided by the plurality of XBRL data pieces. This configuration allows the extraction apparatus 1 to extract XBRL data pieces containing elements to be validated from the input data 9 rapidly.

Furthermore, according to the first embodiment, the extraction apparatus 1 determines an application sequence of the plurality of extraction criteria such that an extraction criterion that yields a lowest frequency of occurrence is applied first. This configuration allows the extraction apparatus 1 to extract a minimum number of XBRL data pieces containing elements to be validated, thereby reducing a load placed on a subsequent part of the extraction process.

Second Embodiment

In the first embodiment, the extraction apparatus 1 acquires a plurality of extraction criteria, each directly specifying an element and an aspect of each of the plurality of XBRL data pieces, from a validation rule. In the description given above, the extraction apparatus 1 determines an application sequence of the plurality of extraction criteria by referring to frequencies of occurrences of values of individual aspects in the XBRL data pieces. However, the extraction apparatus 1 may alternatively be configured as follows. The extraction apparatus 1 groups a plurality of extraction criteria common to a plurality of validation rules. The extraction apparatus 1 determines an application sequence of a plurality of extraction criteria of each of the validation rules by referring to the thus-grouped extraction group and frequencies of occurrences of values of individual aspects in the XBRL data pieces. The extraction apparatus 1 may be configured to reuse an extraction result obtained using the grouped extraction group in a plurality of validation rules.

The reason why, in the second embodiment, a plurality of extraction criteria common to a plurality of validation rules is grouped is described below. Typically, a plurality of validation rules is applied in formula validation of input data. A plurality of extraction criteria is applied for each of the plurality of validation rules. A plurality of validation rules may share a common configuration of extraction criteria in some cases. Even when validation rules differ from each other, if the validation rules share a common configuration of extraction criteria, a result of applying one of the validation rules can be reused in the other validation rule. For this reason, in the second embodiment, a plurality of extraction criteria common to a plurality of validation rules is grouped. It is noted that a situation where a result of applying one of the validation rules can be reused is limited to where the common configuration of extraction criteria is applied first.

When common extraction criteria are grouped and assumed as a virtually single extraction criterion, an estimated narrowed-down count of an extraction criterion exhibiting a highest narrowing effect among the extraction criteria included in the common extraction criteria may preferably be adopted as an estimated narrowed-down count of the virtually single extraction criterion. This will be described below. Specifically, to perform strict estimation, distribution of frequencies of occurrences of a data item having a plurality of specific aspect values is desirably analyzed for each of the extraction criteria in a validation rule. However, when the number of variations of combinations of aspect values is large, processing of conducting data-item-by-data-item analysis in accordance with the variations will impose a load (analysis time and memory usage). When analysis is conducted on distribution of frequencies of occurrences of individual aspect values of a data item, a load imposed by data-item-by-data-item analysis will be light, and an effect of the validation rule as a whole can be estimated by finding a single extraction criterion exhibiting a high narrowing effect.

As described above, by grouping a common configuration of extraction criteria and assuming the common configuration as a virtually single extraction criterion, it is possible to apply the common configuration of extraction criteria only once and reuse a result of the extraction, thereby increasing efficiency of an extraction process.

Under the circumstances, in the second embodiment, the extraction apparatus 1 groups a plurality of extraction criteria common to a plurality of validation rules. The extraction apparatus 1 determines an application sequence of a plurality of extraction criteria of a validation rule by referring to the grouped extraction group and frequencies of occurrences of values of individual aspects in XBRL data pieces for each of the validation rules. This is described below.

[Configuration of Extraction Apparatus According to Second Embodiment]

Figure 10:
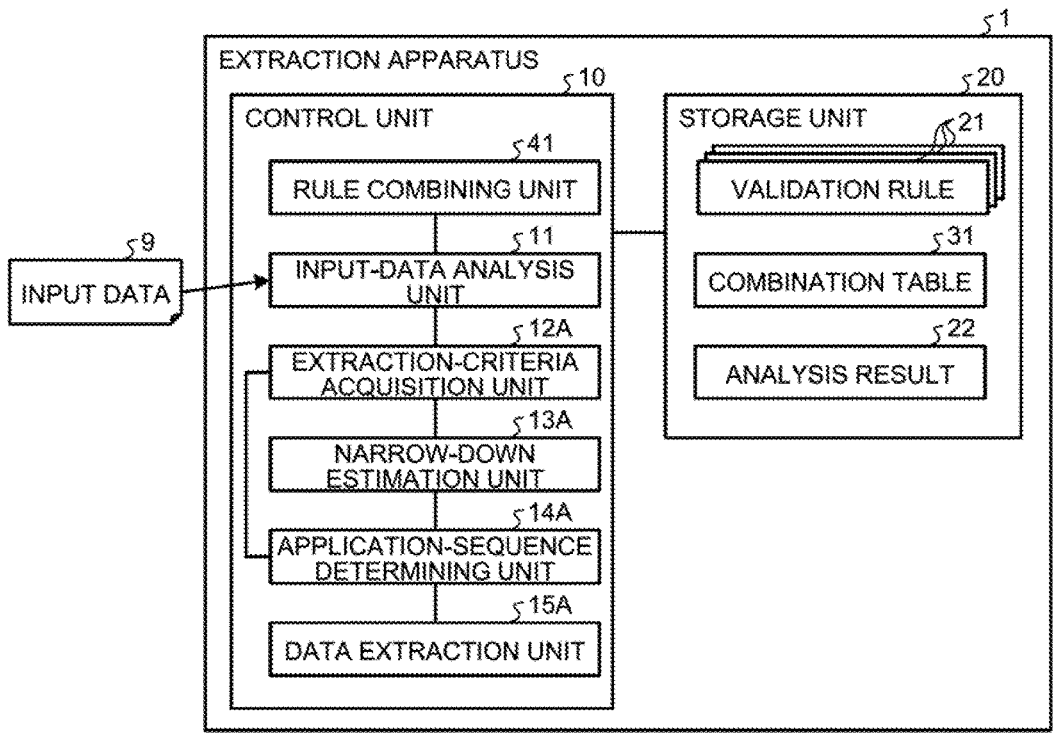
FIG. 10 is a functional block diagram illustrating a configuration of an extraction apparatus according to a second embodiment.

FIG. 10 is a functional block diagram illustrating a configuration of the extraction apparatus according to the second embodiment. Elements identical to those of the extraction apparatus illustrated in FIG. 1 in structure are denoted by identical reference characters and repeated description about the structure and operations is omitted. The second embodiment differs from the first embodiment in additionally including a rule combining unit 41 and a combination table 31. The second embodiment differs from the first embodiment in that an extraction-criteria acquisition unit 12A, a narrow-down estimation unit 13A, an application-sequence determining unit 14A, and a data extraction unit 15A are changed.

The rule combining unit 41 combines a plurality of validation rules that have a plurality of common extraction criteria. The rule combining unit 41 is implemented in advance of when the input data 9 is input. For instance, the rule combining unit 41 retrieves static extraction criteria from each of the plurality of validation rules. The rule combining unit 41 combines a plurality of validation rules that shares a plurality of common extraction criteria (extraction group) based on the retrieved static extraction criteria of each of the plurality of validation rules. The rule combining unit 41 associates the combined plurality of validation rules and stores the associated validation rules in the combination table 31.

Figure 11:
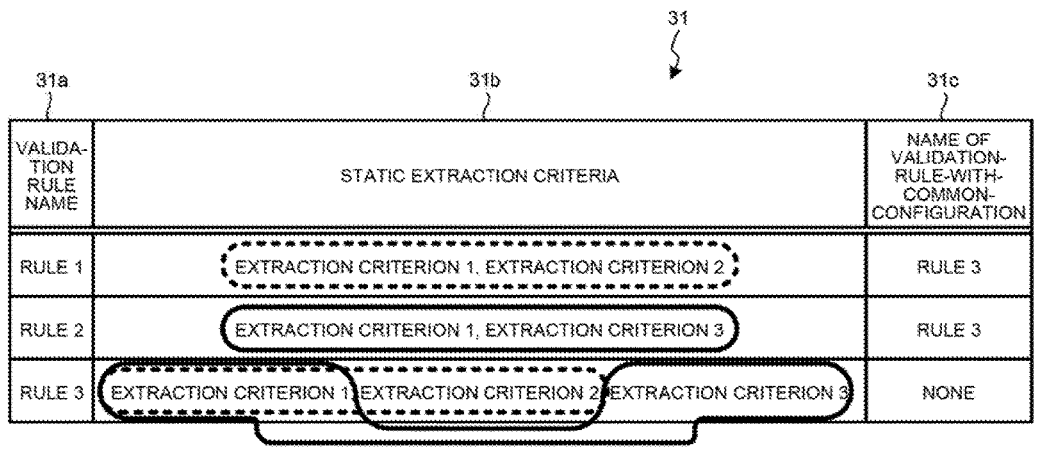
FIG. 11 is a diagram illustrating an example of a data structure of a combination table according to the second embodiment.

A data structure of the combination table 31 is described below with reference to FIG. 11. FIG. 11 is a diagram illustrating an example of a data structure of the combination table according to the second embodiment. As illustrated in FIG. 11, the combination table 31 stores a validation rule name 31a, static extraction criteria 31b, and a name of validation-rule-with-common-configuration 31c that are associated. The validation rule name 31a indicates a name of a validation rule. The static extraction criteria 31b indicate static extraction criteria included in the validation rule indicated by the validation rule name 31a. The name of validation-rule-with-common-configuration 31c indicates a name of a validation rule that has static extraction criteria in common with the validation rule indicated by the validation rule name 31a.

For example, when the validation rule name 31a is "rule 1", "extraction criterion 1, extraction criterion 2" are stored as the static extraction criteria 31b, and "rule 3" is stored as the name of validation-rule-with-common-configuration 31c. It means that the rule 3 has static extraction criteria in common with the rule 1. When the validation rule name 31a is "rule 2", "extraction criterion 1, extraction criterion 3" are stored as the static extraction criteria 31b, and "rule 3" is stored as the name of validation-rule-with-common-configuration 31c. It means that the rule 3 has static extraction criteria in common with the rule 2. When the validation rule name 31a is "rule 3", "extraction criterion 1, extraction criterion 2, extraction criterion 3" are stored as the static extraction criteria 31b, and "none" is stored as the name of validation-rule-with-common-configuration 31c. It means that there is no rule that has static extraction criteria in common with the rule 3.

The extraction-criteria acquisition unit 12A acquires static extraction criteria and dynamic extraction criteria from an extraction-criteria analysis result. Furthermore, the extraction-criteria acquisition unit 12A selects, for each of the validation rules, an extraction group, into which a plurality of common static extraction criteria is grouped, and a remaining static extraction criterion other than the extraction group. For instance, the extraction-criteria acquisition unit 12A performs processing described below for each of the validation rules. The extraction-criteria acquisition unit 12A determines whether a specific validation rule has a configuration of static extraction criteria in common with another validation rule by referring to the combination table 31. Put another way, the extraction-criteria acquisition unit 12A determines whether a configuration of static extraction criteria of the specific validation rule embraces a configuration of static extraction criteria of another validation rule. Upon determining that the specific validation rule has a configuration of static extraction criteria in common with another validation rule, the extraction-criteria acquisition unit 12A selects this other validation rule. This other validation rule corresponds to an extraction group. The extraction-criteria acquisition unit 12A selects, from static extraction criteria of the specific validation rule, a remaining static extraction criterion other than the static extraction criteria of the common configuration.

The narrow-down estimation unit 13A acquires frequencies of occurrences of the extraction group included in the validation rule and the remaining static extraction criterion other than the extraction group by referring to group information about the extraction group and the analysis result 22. Specifically, for each of the validation rules, the narrow-down estimation unit 13A estimates an estimated narrowed-down count of the extraction group and an estimated narrowed-down count of the remaining static extraction criterion other than the extraction group. For instance, the narrow-down estimation unit 13A performs processing described below for each of the validation rules. When, for a specific validation rule, another validation rule corresponding to an extraction group of the specific validation rule is selected by the extraction-criteria acquisition unit 12A, the narrow-down estimation unit 13A retrieves aspects and values to be checked against XBRL data pieces from static extraction criteria that are in common between the specific validation rule and the other validation rule. The narrow-down estimation unit 13A reads out the distribution information 22c associated with the retrieved aspects and values from the analysis result 22 and sets the read-out distribution information 22c as estimated narrowed-down counts associated with the extraction criteria. A narrowing effect of an extraction criterion increases with an increase in the estimated narrowed-down count of the extraction criterion. The narrow-down estimation unit 13A sets a smallest one of the estimated narrowed-down counts as an estimated narrowed-down count of the extraction group. The narrow-down estimation unit 13A reads out the distribution information 22c associated with the remaining static extraction criterion other than the extraction group from the analysis result 22 and sets the read-out distribution information 22c as an estimated narrowed-down count. When the specific validation rule includes a plurality of the extraction groups, the narrow-down estimation unit 13A performs the narrow-down estimation process for each of the included extraction groups.

The application-sequence determining unit 14A determines an application sequence of the extraction group and the remaining static extraction criterion other than the extraction group based on the estimated narrowed-down counts estimated by the narrow-down estimation unit 13A. The application-sequence determining unit 14A determines an application sequence of the static extraction criteria included in the extraction group based on estimated narrowed-down counts estimated by the narrow-down estimation unit 13A. For instance, the application-sequence determining unit 14A performs processing described below for each of the validation rules. The application-sequence determining unit 14A determines, by referring to the estimated narrowed-down count of the extraction group and the estimated narrowed-down count of the remaining static extraction criterion other than the extraction group, an application sequence of the extraction group and the static extraction criteria such that the smaller the estimated narrowed-down count of an extraction group or a static extraction criterion, the earlier the extraction group or the static extraction criterion is applied. Furthermore, the application-sequence determining unit 14A determines, by referring to the estimated narrowed-down counts of the static extraction criteria included in the extraction group, an application sequence of the static extraction criteria such that the smaller the estimated narrowed-down count of a static extraction criterion, the earlier the static extraction criterion is applied. When the validation rule includes a plurality of the extraction groups, the application-sequence determining unit 14A may preferably determine an extraction group based on estimated narrowed-down counts of the extraction groups. Specifically, the application-sequence determining unit 14A may preferably determine an extraction group whose estimated narrowed-down count is smallest as an extraction group to be used in determination of the application sequence.

The data extraction unit 15A extracts, for each of the validation rules, XBRL data pieces by applying the extraction criteria to input data using the application sequence determined by the application-sequence determining unit 14A. In a situation where data extraction is to be conducted using a certain validation rule, when data extraction using an extraction group included in the certain validation rule has already been conducted, the data extraction unit 15A acquires a result of the already-performed data extraction as a result of data extraction using this certain validation rule. Note that a situation where the result of data extraction can be acquired is limited to where the extraction group is applied first in this certain validation rule. This is because when the extraction group is applied secondly or later, consistency with a result of data extraction performed prior to application of the extraction group will be lost.

Figure 12:
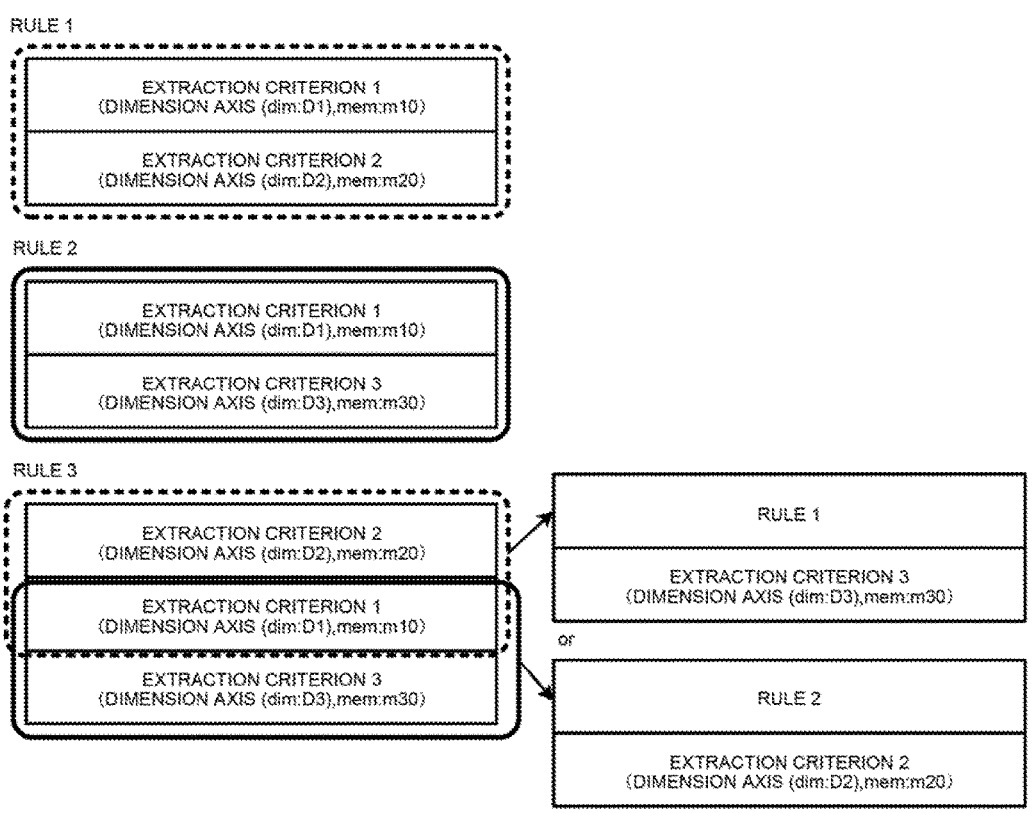
FIG. 12 is a diagram illustrating an example of extraction criteria acquired by an extraction-criteria acquisition unit according to the second embodiment.

Next, processing performed by the extraction-criteria acquisition unit 12A is described with reference to FIG. 12. FIG. 12 is a diagram illustrating an example of extraction criteria acquired by the extraction-criteria acquisition unit according to the second embodiment. It is assumed in FIG. 12 that the extraction-criteria acquisition unit 12A refers to the combination table 31 illustrated in FIG. 11.

As illustrated in FIG. 12, the extraction-criteria acquisition unit 12A acquires static extraction criteria and dynamic extraction criteria from an extraction-criteria analysis result. In this example, in the rule 1, the extraction criterion 1 and the extraction criterion 2 are acquired as static extraction criteria. In the rule 2, the extraction criterion 1 and the extraction criterion 3 are acquired as static extraction criteria. In the rule 3, the extraction criterion 1, the extraction criterion 2, and the extraction criterion 3 are acquired as static extraction criteria.

The extraction-criteria acquisition unit 12A determines whether a specific validation rule has a configuration of static extraction criteria in common with another validation rule by referring to the combination table 31. In this example, it is determined that the rule 1 does not have a configuration of static extraction criteria in common with another rule. It is determined that the rule 2 does not have a configuration of static extraction criteria in common with another rule. It is determined that the rule 3 has a configuration of static extraction criteria in common with another rule. Specifically, the configuration of the static extraction criteria of the rule 3 is the extraction criterion 1, the extraction criterion 2, and the extraction criterion 3. Hence, the rule 3 is determined to have a configuration in common with the rule 1 whose configuration of static extraction criteria are the extraction criterion 1 and the extraction criterion 2. The configuration of the static extraction criteria of the rule 3 are the extraction criterion 1, the extraction criterion 2, and the extraction criterion 3. Hence, the rule 3 is determined to have a configuration in common with the rule 2 whose configuration of static extraction criteria are the extraction criterion 1 and the extraction criterion 3.

Upon determining that the specific validation rule has a configuration of static extraction criteria in common with another validation rule, the extraction-criteria acquisition unit 12A performs processing described below. The extraction-criteria acquisition unit 12A selects the other validation rule and selects a remaining static extraction criterion other than the static extraction criteria of the common configuration from the static extraction criteria of the specific validation rule. In this example, for the rule 3, the rule 1 is selected as the other validation rule, and the extraction criterion 3 is selected as the remaining static extraction criterion other than the static extraction criteria of the common configuration from the static extraction criteria of the rule 3. For the rule 3, the rule 2 is selected as the other validation rule, and the extraction criterion 2 is selected as the remaining static extraction criterion other than the static extraction criteria of the common configuration from the static extraction criteria of the rule 3.

Figure 13:
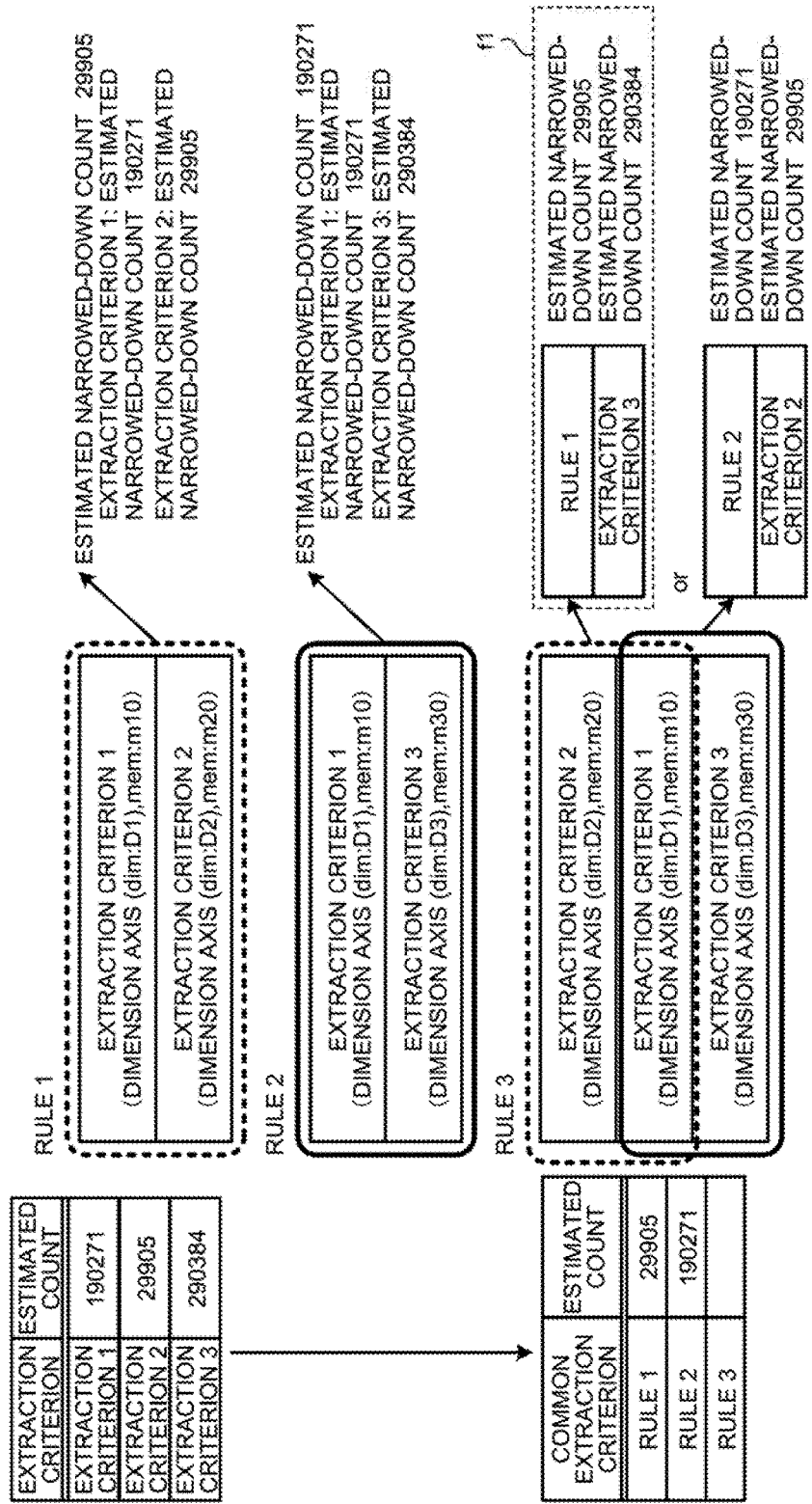
FIG. 13 is a diagram illustrating a specific example of processing performed by a narrow-down estimation unit according to the second embodiment.

Next, processing performed by the narrow-down estimation unit 13A is described with reference to FIG. 13. FIG. 13 is a diagram illustrating a specific example of processing performed by the narrow-down estimation unit according to the second embodiment. It is assumed in FIG. 13 that the extraction-criteria acquisition unit 12A has not selected an extraction group for the validation rules 1 and 2. It is assumed that, for the validation rule 3, the extraction-criteria acquisition unit 12A has selected the validation rule 1 as an extraction group and has selected the extraction criterion 3 as a remaining static extraction criterion other than the extraction group. It is assumed that, for the validation rule 3, the extraction-criteria acquisition unit 12A has selected the validation rule 2 as an extraction group and has selected the extraction criterion 2 as a remaining static extraction criterion other than the extraction group. Hereinafter, a validation rule may be abbreviated as a rule.

As illustrated in FIG. 13, because no extraction group is selected for the rule 1, the narrow-down estimation unit 13A retrieves aspects and values to be checked against XBRL data pieces from the static extraction criteria. In this example, from the extraction criterion 1, "Dimension Axis (dim:D1)" is retrieved as an aspect, and "mem:m10" is retrieved as its value. From the static extraction criterion 2, "Dimension Axis (dim:D2)" is retrieved as an aspect, and "mem:m20" is retrieved as its value.

The narrow-down estimation unit 13A reads out the distribution information 22c associated with the retrieved aspects and values from the analysis result 22 and sets the read-out distribution information 22c as estimated narrowed-down counts associated with the extraction criteria. In this example, narrowing down to "190271" XBRL data pieces is estimated, where "190271" is associated with the extraction criterion 1. Narrowing down to "29905" XBRL data pieces is estimated, where "29905" is associated with the extraction criterion 2. The narrow-down estimation unit 13A sets "29905", which is the smallest estimated narrowed-down count, as an estimated narrowed-down count of the rule 1.

Because no extraction group is selected for the rule 2, the narrow-down estimation unit 13A retrieves aspects and values to be checked against XBRL data pieces from the static extraction criteria. In this example, from the extraction criterion 1, "Dimension Axis (dim:D1)" is retrieved as an aspect, and "mem:m10" is retrieved as its value. From the static extraction criterion 3, "Dimension Axis (dim:D3)" is retrieved as an aspect, and "mem:m30" is retrieved as its value.

The narrow-down estimation unit 13A reads out the distribution information 22c associated with the retrieved aspects and values from the analysis result 22 and sets the read-out distribution information 22c as estimated narrowed-down counts associated with the extraction criteria. In this example, narrowing down to "190271" XBRL data pieces is estimated, where "190271" is associated with the extraction criterion 1. Narrowing down to "290384" XBRL data pieces is estimated, where "290384" is associated with the extraction criterion 3. The narrow-down estimation unit 13A sets "190271", which is the smallest estimated narrowed-down count, as an estimated narrowed-down count of the rule 2.

Next, because the rule 1 is selected as an extraction group for the rule 3, the narrow-down estimation unit 13A acquires the estimated narrowed-down count, which has already been estimated, of the rule 1. In this example, "29905" is acquired as the estimated narrowed-down count of the rule 1.

Because the extraction criterion 3 is selected as the remaining static extraction criterion other than the extraction group, the narrow-down estimation unit 13A retrieves an aspect and a value to be checked against XBRL data pieces from the extraction criterion 3. In this example, "Dimension Axis (dim:D3)" is retrieved as the aspect, and "mem:m30" is retrieved as its value. The narrow-down estimation unit 13A reads out the distribution information 22c associated with the retrieved aspect and value from the analysis result 22 and sets the read-out distribution information 22c as an estimated narrowed-down count associated with the extraction criterion. In this example, narrowing down to "290384" XBRL data pieces is estimated, where "290384" is associated with the extraction criterion 3.

Because the rule 2 is selected as an extraction group for the rule 3, the narrow-down estimation unit 13A acquires the estimated narrowed-down count, which has already been estimated, of the rule 2. In this example, "190271" is acquired as the estimated narrowed-down count of the rule 2.

Because the extraction criterion 2 is selected as the remaining static extraction criterion other than the extraction group, the narrow-down estimation unit 13A retrieves an aspect and a value to be checked against XBRL data pieces from the extraction criterion 2. In this example, "Dimension Axis (dim:D2)" is retrieved as the aspect, and "mem:m20" is retrieved as its value. The narrow-down estimation unit 13A reads out the distribution information 22c associated with the retrieved aspect and value from the analysis result 22 and sets the read-out distribution information 22c as an estimated narrowed-down count associated with the extraction criterion. In this example, narrowing down to "29905" XBRL data pieces is estimated, where "29905" is associated with the extraction criterion 2. Hence, because the estimated narrowed-down count of the rule 1 is "29905" and the estimated narrowed-down count of the rule 2 is "190271", the application-sequence determining unit 14A determines the rule 1 indicated by reference characters f1 as an extraction group to be used in determination of the application sequence.

Figure 14:
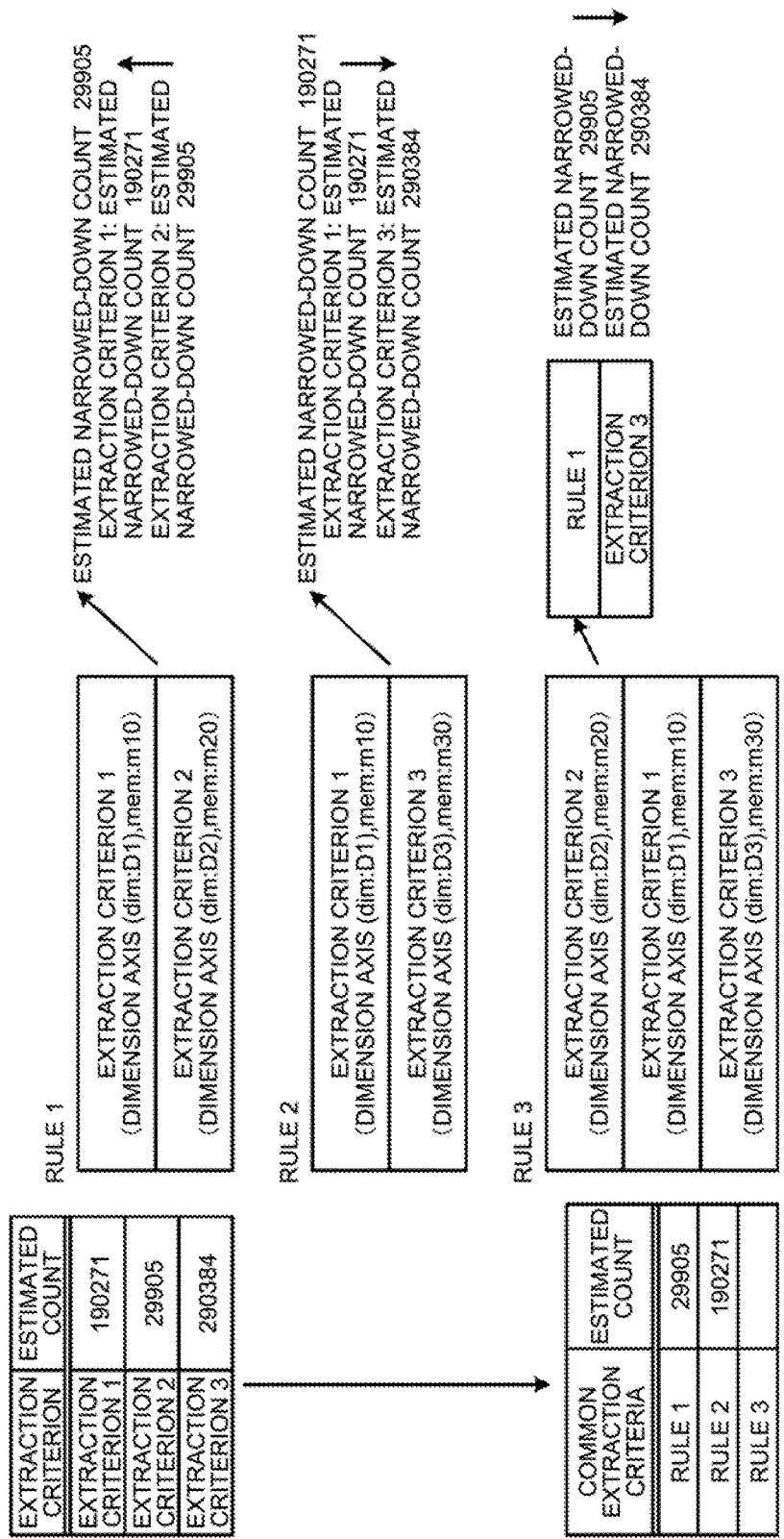
FIG. 14 is a diagram illustrating a specific example of processing performed by an application-sequence determining unit according to the second embodiment.

Next, processing performed by the application-sequence determining unit 14A is described with reference to FIG. 14. FIG. 14 is a diagram illustrating a specific example of processing performed by the application-sequence determining unit according to the second embodiment. It is assumed that estimated narrowed-down counts of the rules 1 to 3 are those illustrated in FIG. 13. It is assumed that the rule 1 is determined as the extraction group to be used in determination of the application sequence in the rule 3.

As illustrated in FIG. 14, no extraction group for the rule 1 is selected by the extraction-criteria acquisition unit 12A. Hence, the application-sequence determining unit 14A determines, by referring to the estimated narrowed-down counts of the plurality of extraction criteria, an application sequence of the extraction criteria such that the smaller the estimated narrowed-down count of an extraction criterion, the earlier the extraction criterion is applied. In this example, the estimated narrowed-down count of the extraction criterion 1 is "190271", and the estimated narrowed-down count of the extraction criterion 2 is "29905". Hence, the application sequence of the extraction criteria is determined as (extraction criterion 2, extraction criterion 1).

No extraction group for the rule 2 is selected by the extraction-criteria acquisition unit 12A. Hence, the application-sequence determining unit 14A determines, by referring to the estimated narrowed-down counts of the plurality of extraction criteria, an application sequence of the extraction criteria such that the smaller the estimated narrowed-down count of an extraction criterion, the earlier the extraction criterion is applied. In this example, the estimated narrowed-down count of the extraction criterion 1 is "190271", and the estimated narrowed-down count of the extraction criterion 3 is "290384". Hence, the application sequence of the extraction criteria is determined as (extraction criterion 1, extraction criterion 3).

An extraction group for the rule 3 is selected by the extraction-criteria acquisition unit 12A. The application-sequence determining unit 14A determines the rule 1 as an extraction group to be used in determination of the application sequence. The application-sequence determining unit 14A determines, by referring to the estimated narrowed-down count of the extraction group and the estimated narrowed-down count of a remaining static extraction criterion other than the extraction group, an application sequence of the extraction group and the static extraction criteria such that the smaller the estimated narrowed-down count of an extraction group or a static extraction criterion, the earlier the extraction group or the static extraction criterion is applied. In this example, the estimated narrowed-down count of the rule 1, which serves as the extraction group, is "29905", and the estimated narrowed-down count of the extraction criterion 3 that is not included in the extraction group is "290384". Hence, the application sequence is determined as (rule 1, extraction criterion 3).

For the rule 3, the application-sequence determining unit 14A determines, by referring to the estimated narrowed-down counts of the static extraction criteria included in the extraction group, an application sequence of the extraction criteria such that the smaller the estimated narrowed-down count of a static extraction criterion, the earlier the static extraction criterion is applied. In this example, the estimated narrowed-down count of the extraction criterion 1 included in the rule 1, which serves as the extraction group, is "190271", and the estimated narrowed-down count of the extraction criterion 2 included in the same is "29905". Hence, the application sequence of the extraction criteria included in the rule is determined as (extraction criterion 2, extraction criterion 1).

Figures 15A, 15B:
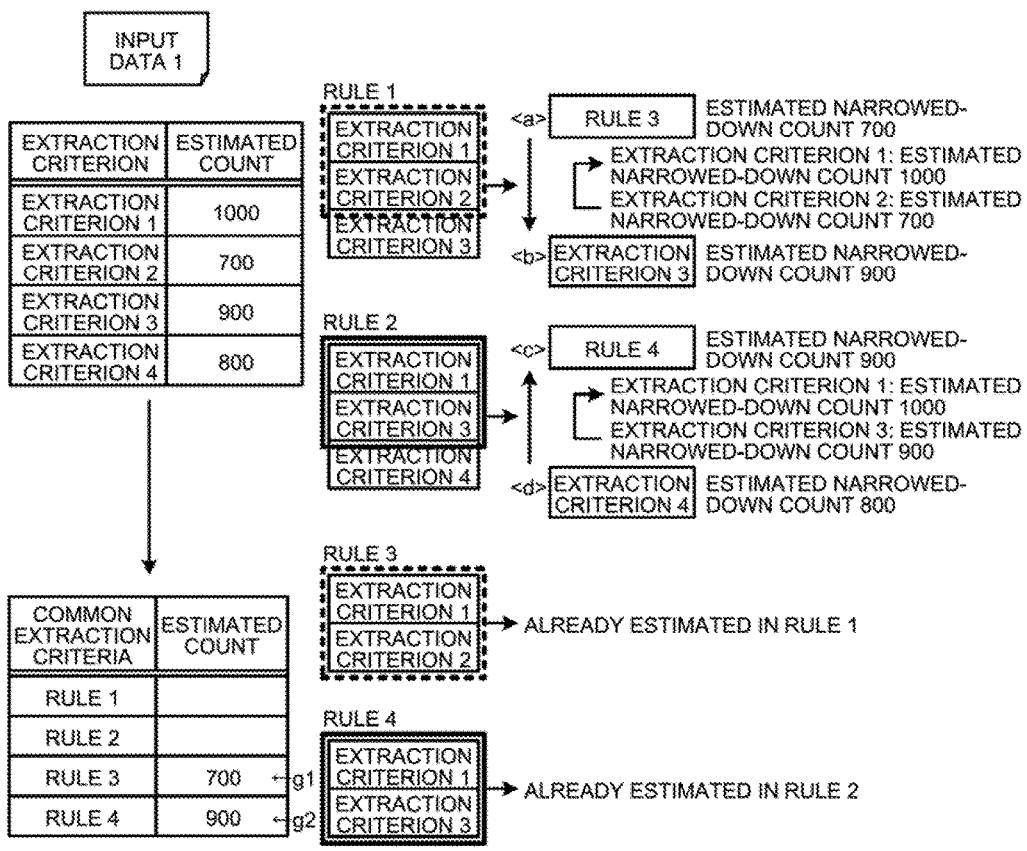
FIG. 15A is a first diagram illustrating an example of utilizing an extraction process according to the second embodiment.
FIG. 15B is a second diagram illustrating the example of utilizing the extraction process according to the second embodiment.
Figure 15C:
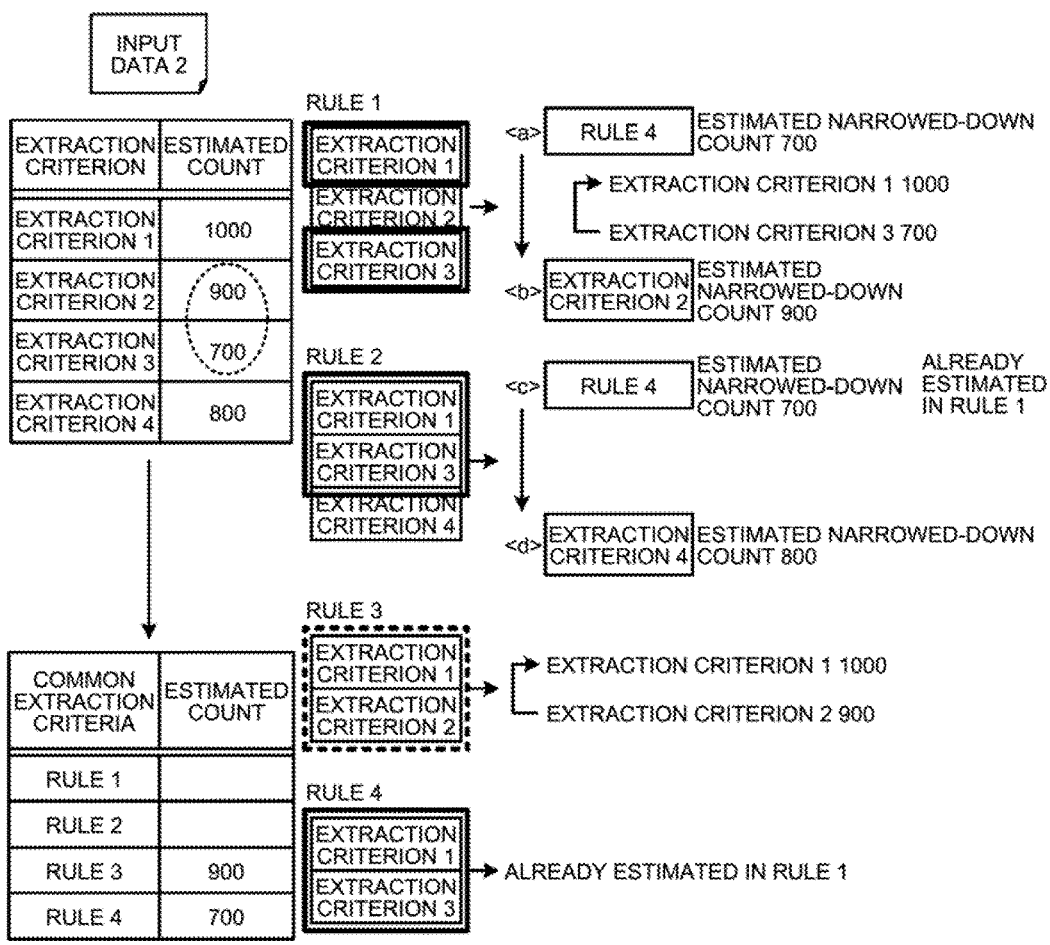
FIG. 15C is a third diagram illustrating the example of utilizing the extraction process according to the second embodiment.

Next, an example of utilizing an extraction process according to the second embodiment is described below with reference to FIG. 15A to FIG. 15C. FIG. 15A to FIG. 15C are diagrams illustrating an example of utilizing the extraction process according to the second embodiment. FIG. 15A is a diagram illustrating an example of the combination table 31. FIG. 15B indicates an extraction process pertaining to input data 1. FIG. 15C indicates an extraction process pertaining to input data 2, which is updated input data.

As illustrated in FIG. 15A, the rule combining unit 41 combines a plurality of validation rules that share a plurality of common extraction criteria (extraction group) and stores the combined plurality of validation rules that are associated with each other in the combination table 31. In the combination table 31, when the validation rule name 31a is "rule 1", "extraction criterion 1, extraction criterion 2, extraction criterion 3" are stored as the static extraction criteria 31b, and "none" is stored as the name of validation-rule-with-common-configuration 31c. It means that there is no rule that has static extraction criteria in common with the rule 1. When the validation rule name 31a is "rule 2", "extraction criterion 1, extraction criterion 3, extraction criterion 4" are stored as the static extraction criteria 31b, and "none" is stored as the name of validation-rule-with-common-configuration 31c. It means that there is no rule that has static extraction criteria in common with the rule 2. When the validation rule name 31a is "rule 3", "extraction criterion 1, extraction criterion 2" are stored as the static extraction criteria 31b, and "rule 1" is stored as the name of validation-rule-with-common-configuration 31c. It means that the rule 3 has static extraction criteria in common with the rule 1. When the validation rule name 31a is "rule 4", "extraction criterion 1, extraction criterion 3" are stored as the static extraction criteria 31b, and "rule 1, rule 2" are stored as the name of validation-rule-with-common-configuration 31c. It means that the rule 4 has static extraction criteria in common with the rule 1. It means that the rule 4 has static extraction criteria in common with the rule 2.

As illustrated in FIG. 15B, distribution information (estimated counts) of the plurality of extraction criteria of the input data 1 analyzed by the input-data analysis unit 11 is as follows. It is assumed that the estimated count of the extraction criterion 1 is "1000". It is assumed that the estimated count of the extraction criterion 2 is "700". It is assumed that the estimated count of the extraction criterion 3 is "900". It is assumed that the estimated count of the extraction criterion 4 is "800".

For the rule 1, the extraction-criteria acquisition unit 12A selects the rule 3 as its extraction group and selects the extraction criterion 3 as a remaining static extraction criterion other than the extraction group by referring to the combination table 31. For the rule 2, the extraction-criteria acquisition unit 12A selects the rule 4 as its extraction group and selects the extraction criterion 4 as a remaining static extraction criterion other than the extraction group by referring to the combination table 31. For the rule 3, the extraction-criteria acquisition unit 12A finds that the rule 4 has no extraction group by referring to the combination table 31 and selects the extraction criteria 1 and 2 as extraction criteria that are not included in an extraction group. For the rule 4, the extraction-criteria acquisition unit 12A finds that the rule 4 has no extraction group by referring to the combination table 31 and selects the extraction criteria 1 and 3 as extraction criteria that are not included in an extraction group.

Next, for the rule 1 that has the rule 3 as its extraction group, the narrow-down estimation unit 13A sets the estimated narrowed-down counts of the extraction criteria 1 and 2 that are in common between the rule 1 and the rule 3 by referring to the analysis result 22. The narrow-down estimation unit 13A sets a smallest one of the estimated narrowed-down counts as an estimated narrowed-down count of the rule 3. In this example, the estimated narrowed-down count of the extraction criterion 1 is "1000", and the estimated narrowed-down count of the extraction criterion 2 is "700". Hence, the estimated narrowed-down count of the rule 3 is set to "700" (g1). The narrow-down estimation unit 13A sets an estimated narrowed-down count of the extraction criterion 3 that is not included in the extraction group by referring to the analysis result 22. In this example, the estimated narrowed-down count of the extraction criterion 3 is set to "900".

The rule 1 has the rule 4 as its extraction group. The estimated narrowed-down counts of the extraction criteria 1 and 3 that make up the extraction criteria of the rule 4 are "1000" and "900", respectively. Hence, the estimated narrowed-down count of the rule 4 is set to "900", which is the smallest estimated narrowed-down count. Hence, although the rule 1 has the rule 3 and the rule 4 as its extraction groups, the rule 3 that is smaller in the estimated narrowed-down count is determined as an extraction group to be used in determination of the application sequence.

The application-sequence determining unit 14A determines, by referring to the estimated narrowed-down count of the rule 3 and the estimated narrowed-down count of the extraction criterion 3 that is not included in the rule 3, an application sequence such that the smaller the estimated narrowed-down count of a rule or an extraction criterion, the earlier the rule or the extraction criterion is applied. In this example, the estimated narrowed-down count of the rule 3 is "700", and the estimated narrowed-down count of the extraction criterion 3 is "900". Hence, the application sequence is determined as (rule 3, extraction criterion 3). Furthermore, the application-sequence determining unit 14A determines, by referring to the estimated narrowed-down counts of the extraction criteria included in the rule 3, an application sequence of the extraction criteria such that the smaller the estimated narrowed-down count of an extraction criterion, the earlier the extraction criterion is applied. In this example, the estimated narrowed-down count of the extraction criterion 1 is "1000", and the estimated narrowed-down count of the extraction criterion 2 is "700". Hence, the application sequence is determined as (extraction criterion 2, extraction criterion 1).

The data extraction unit 15A extracts XBRL data pieces using the rule 1 by applying the extraction criteria to the input data 1 using the application sequence determined by the application-sequence determining unit 14A. The data extraction unit 15A then stores a result of extraction using the rule 3, which serves as the extraction group.

Next, for the rule 2 that has the rule 4 as its extraction group, the narrow-down estimation unit 13A sets the estimated narrowed-down counts of the extraction criteria 1 and 3 that are in common between the rule 2 and the rule 4 by referring to the analysis result 22. The narrow-down estimation unit 13A sets a smallest one of the estimated narrowed-down counts as an estimated narrowed-down count of the rule 4. In this example, the estimated narrowed-down count of the extraction criterion 1 is "1000", and the estimated narrowed-down count of the extraction criterion 3 is "900". Hence, the estimated narrowed-down count of the rule 4 is set to "900" (g2). The narrow-down estimation unit 13A sets an estimated narrowed-down count of the extraction criterion 4 that is not included in the extraction group by referring to the analysis result 22. In this example, the estimated narrowed-down count of the extraction criterion 4 is set to "800".

The application-sequence determining unit 14A determines, by referring to the estimated narrowed-down count of the rule 4 and the estimated narrowed-down count of the extraction criterion 4 that is not included in the rule 4, an application sequence such that the smaller the estimated narrowed-down count of a rule or an extraction criterion, the earlier the rule or the extraction criterion is applied. In this example, the estimated narrowed-down count of the rule 4 is "900", and the estimated narrowed-down count of the extraction criterion 4 is "800". Hence, the application sequence is determined as (extraction criterion 4, rule 4). Furthermore, the application-sequence determining unit 14A determines, by referring to the estimated narrowed-down counts of the extraction criteria included in the rule 4, an application sequence of the extraction criteria such that the smaller the estimated narrowed-down count of an extraction criterion, the earlier the extraction criterion is applied. In this example, the estimated narrowed-down count of the extraction criterion 1 is "1000", and the estimated narrowed-down count of the extraction criterion 3 is "900". Hence, the application sequence is determined as (extraction criterion 3, extraction criterion 1).

The data extraction unit 15A extracts XBRL data pieces using the rule 2 by applying the extraction criteria to the input data 1 using the application sequence determined by the application-sequence determining unit 14A. The data extraction unit 15A then stores a result of extraction using the rule 4, which serves as the extraction group.

Next, because the rule 3 has no extraction group and the extraction criteria of the rule 3 have already been estimated in the rule 1, the narrow-down estimation unit 13A utilizes the result of estimation made in the rule 1 rather than making estimation for the rule 3. The data extraction unit 15A extracts XBRL data pieces using the rule 3 by applying the extraction criteria to the input data 1 using the application sequence determined by the application-sequence determining unit 14A. When the rule 1 has already been processed, because a result of applying the extraction criteria of the rule 3 included in the rule 1 has been stored, the data extraction unit 15A acquires the stored result as an extraction result. Specifically, in that case, processing of applying the extraction criteria of the rule 3 is performed only once in a validation process of the rule 3 in the rule 1.

Next, because the rule 4 has no extraction group and the rule 4 has already been estimated in the rule 2, the narrow-down estimation unit 13A utilizes the result of estimation made in the rule 2 rather than making estimation for the rule 4. The data extraction unit 15A extracts XBRL data pieces using the rule 4 by applying the extraction criteria to the input data 1 using the application sequence determined by the application-sequence determining unit 14A. Even when the rule 2 has already been processed, because the extraction criteria of the rule 4 included in the rule 2 have not been applied first, a result of applying the extraction criteria is not stored. Hence, reuse of an extraction result is not performed.

It is assumed that, as illustrated in FIG. 15C, distribution information (estimated counts) of a plurality of extraction criteria of the input data 2 analyzed by the input-data analysis unit 11 is updated as follows. It is assumed that the estimated count of the extraction criterion 1 is "1000". It is assumed that the estimated count of the extraction criterion 2 is "900". It is assumed that the estimated count of the extraction criterion 3 is "700". It is assumed that the estimated count of the extraction criterion 4 is "800". Thus, it is assumed that the estimated counts of the extraction criterion 2 and the extraction criterion 3 are updated.

For the rule 1 that has the rule 3 as its extraction group, the narrow-down estimation unit 13A sets the estimated narrowed-down counts of the extraction criteria 1 and 2 that are in common between the rule 1 and the rule 3 by referring to the analysis result 22. The narrow-down estimation unit 13A sets a smallest one of the estimated narrowed-down counts as an estimated narrowed-down count of the rule 3. In this example, the estimated narrowed-down count of the extraction criterion 1 is "1000", and the estimated narrowed-down count of the extraction criterion 2 is "900". Hence, the estimated narrowed-down count of the rule 3 is set to "900". The narrow-down estimation unit 13A sets an estimated narrowed-down count of the extraction criterion 3 that is not included in the extraction group by referring to the analysis result 22. In this example, the estimated narrowed-down count of the extraction criterion 3 is set to "700".

The rule 1 has the rule 4 as its extraction group. The estimated narrowed-down counts of the extraction criteria 1 and 3 that are in common between the rule 1 and the rule 4 are "1000" and "700", respectively. Hence, the estimated narrowed-down count of the rule 4 is set to "700", which is the smallest estimated narrowed-down count. The narrow-down estimation unit 13A sets an estimated narrowed-down count of the extraction criterion 2 that is not included in the extraction group by referring to the analysis result 22. In this example, the estimated narrowed-down count of the extraction criterion 2 is set to "900". Hence, although the rule 1 has the rule 3 and the rule 4 as its extraction groups, the rule 4 that is smaller in the estimated narrowed-down count is determined as an extraction group to be used in determination of the application sequence.

The application-sequence determining unit 14A determines, by referring to the estimated narrowed-down count of the rule 4 and the estimated narrowed-down count of the extraction criterion 4 that is not included in the rule 2, an application sequence such that the smaller the estimated narrowed-down count of a rule or an extraction criterion, the earlier the rule or the extraction criterion is applied. In this example, the estimated narrowed-down count of the rule 4 is "700", and the estimated narrowed-down count of the extraction criterion 2 is "900". Hence, the application sequence is determined as (rule 4, extraction criterion 2). Furthermore, the application-sequence determining unit 14A determines, by referring to the estimated narrowed-down counts of the extraction criteria included in the rule 4, an application sequence of the extraction criteria such that the smaller the estimated narrowed-down count of an extraction criterion, the earlier the extraction criterion is applied. In this example, the estimated narrowed-down count of the extraction criterion 1 is "1000", and the estimated narrowed-down count of the extraction criterion 3 is "700". Hence, the application sequence is determined as (extraction criterion 3, extraction criterion 1).

The data extraction unit 15A extracts XBRL data pieces using the rule 1 by applying the extraction criteria to the input data 2 using the application sequence determined by the application-sequence determining unit 14A. The data extraction unit 15A then stores a result of extraction using the rule 4, which serves as the extraction group.

Next, because the rule 2 has the rule 4 as its extraction group and the rule 4 has already been estimated in the rule 1, the narrow-down estimation unit 13A utilizes the result of estimation made in the rule 1. The estimated narrowed-down count of the rule 4 is "700". The narrow-down estimation unit 13A sets an estimated narrowed-down count of the extraction criterion 4 that is not included in the extraction group by referring to the analysis result 22. In this example, the estimated narrowed-down count of the extraction criterion 4 is set to "800".

The application-sequence determining unit 14A determines, by referring to the estimated narrowed-down count of the rule 4 and the estimated narrowed-down count of the extraction criterion 4 that is not included in the rule 4, an application sequence such that the smaller the estimated narrowed-down count of a rule or an extraction criterion, the earlier the rule or the extraction criterion is applied. In this example, the estimated narrowed-down count of the rule 4 is "700", and the estimated narrowed-down count of the extraction criterion 4 is "800". Hence, the application sequence is determined as (rule 4, extraction criterion 4).

The data extraction unit 15A extracts XBRL data pieces using the rule 2 by applying the extraction criteria to the input data 2 using the application sequence determined by the application-sequence determining unit 14A. The data extraction unit 15A then acquires a result of extraction using the rule 4, which serves as the extraction group. The data extraction unit 15A extracts XBRL data pieces by inputting a result of extraction using the rule 4 and applying the extraction criterion 4.

Next, because the rule 3 has no extraction group and estimation for the rule 3 is not made in another rule, the narrow-down estimation unit 13A sets the estimated narrowed-down counts of the extraction criteria 1 and 2 by referring to the analysis result 22. The narrow-down estimation unit 13A sets a smallest one of the estimated narrowed-down counts as an estimated narrowed-down count of the rule 3. In this example, the estimated narrowed-down count of the extraction criterion 1 is "1000", and the estimated narrowed-down count of the extraction criterion 2 is "900". Hence, the estimated narrowed-down count of the rule 3 is set to "900".

The application-sequence determining unit 14A determines, by referring to the estimated narrowed-down counts of the extraction criteria included in the rule 3, an application sequence of the extraction criteria such that the smaller the estimated narrowed-down count of an extraction criterion, the earlier the extraction criterion is applied. In this example, the estimated narrowed-down count of the extraction criterion 1 is "1000", and the estimated narrowed-down count of the extraction criterion 2 is "900". Hence, the application sequence is determined as (extraction criterion 2, extraction criterion 1).

The data extraction unit 15A extracts XBRL data pieces using the rule 3 by applying the extraction criteria to the input data 2 using the application sequence determined by the application-sequence determining unit 14A.

Next, because the rule 4 has no extraction group and the rule 4 has already been estimated in the rule 1, the narrow-down estimation unit 13A utilizes the result of estimation made in the rule 1 rather than making estimation for the rule 4. The data extraction unit 15A extracts XBRL data pieces using the rule 4 by applying the extraction criteria to the input data 2 using the application sequence determined by the application-sequence determining unit 14A. When the rule 1 has already been processed, because a result of applying the extraction criteria of the rule 4 has been stored, the data extraction unit 15A acquires the stored result as an extraction result. Specifically, in that case, processing of applying the extraction criteria of the rule 4 is performed only once in a validation process of the rule 4 in the rule 1.

Thus, the extraction apparatus 1 assumes a common configuration of extraction criteria shared by a plurality of validation rules as an extraction group and handles the extraction group as a virtually single extraction criterion. Hence, efficiency of the extraction process as a whole can be increased by reusing an estimation result and an extraction result pertaining to the extraction group. Furthermore, the extraction apparatus 1 determines the extraction group responsive to updating of distribution information, which is updated responsive to updating of a plurality of XBRL data pieces, and therefore can optimize application of extraction criteria depending on characteristics of XBRL data pieces.

[Procedure for Extraction Process]

Figure 16:
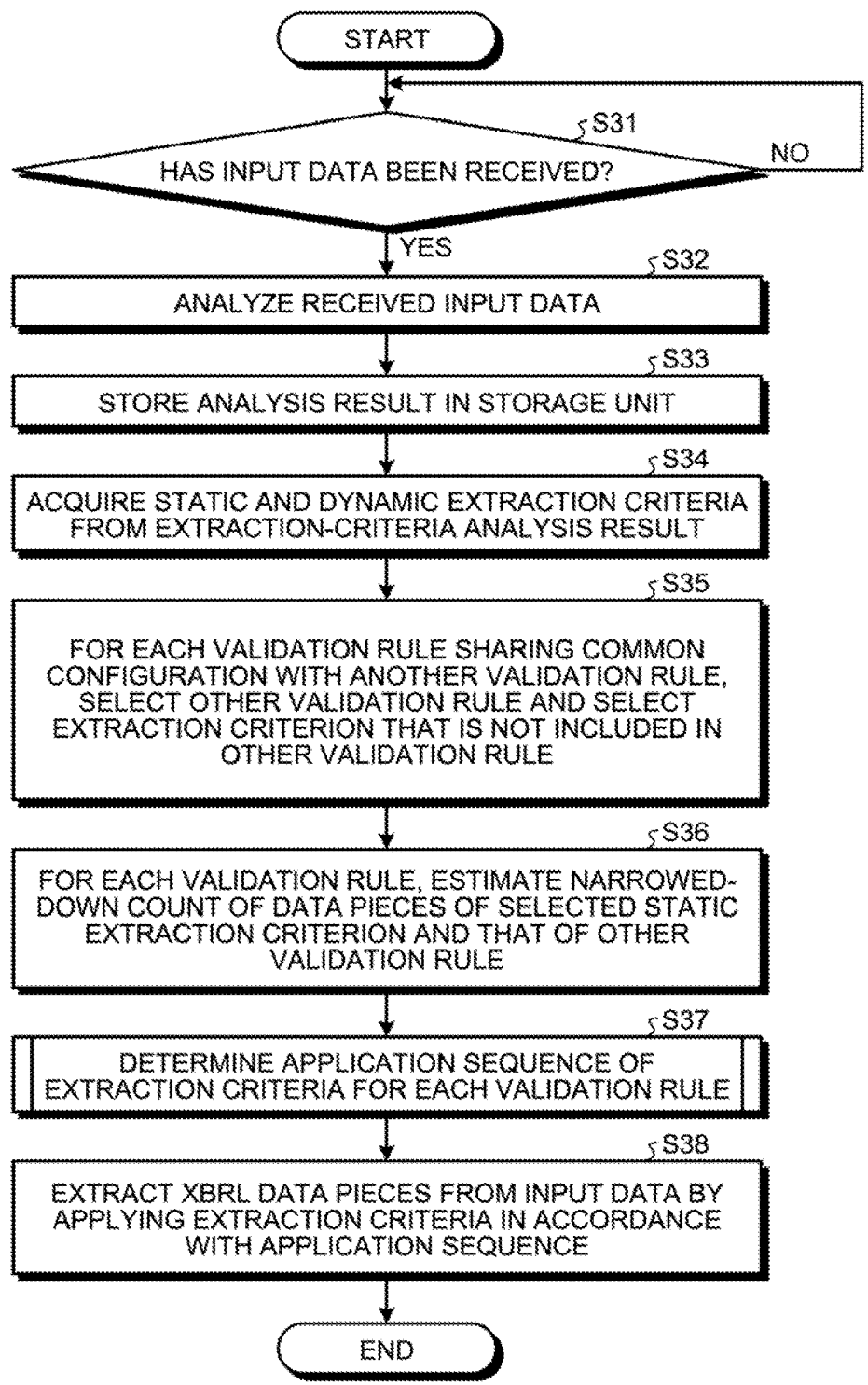
FIG. 16 is a diagram illustrating an example of a flowchart for the extraction process according to the second embodiment.

Next, a procedure for an extraction process according to the second embodiment is described below with reference to FIG. 16. FIG. 16 is a diagram illustrating an example of a flowchart for the extraction process according to the second embodiment. It is assumed that the rule combining unit 41 has created the combination table 31. It is also assumed that an extraction-criteria analysis result is stored in the storage unit 20 in advance of receiving the input data 9.

First, the input-data analysis unit 11 determines whether the input data 9 has been received (Step S31). Upon determining that the input data 9 has not been received (No at Step S31), the input-data analysis unit 11 iterates the determination process until the input data 9 is received.

On the other hand, upon determining that the input data 9 has been received (Yes at Step S31), the input-data analysis unit 11 analyzes the received input data 9 (Step S32). For instance, the input-data analysis unit 11 calculates, from the input data 9, frequencies of occurrences of individual values associated with an aspect for each of various types of aspects. The input-data analysis unit 11 stores the frequencies of occurrences of the individual values associated with an aspect calculated for each of the aspects in the analysis result 22 (Step S33).

Thereafter, for each of validation rules, the extraction-criteria acquisition unit 12A acquires static extraction criteria and dynamic extraction criteria from the extraction-criteria analysis result (Step S34). For each validation rule that has a configuration in common with another validation rule, the extraction-criteria acquisition unit 12A selects the other validation rule and selects a static extraction criterion that is not included in the other validation rule (Step S35). Specifically, the extraction-criteria acquisition unit 12A selects, for each of the validation rules, an extraction group, into which a plurality of common static extraction criteria is grouped, and a remaining static extraction criterion other than the extraction group.

Thereafter, the narrow-down estimation unit 13A estimates, for each of the validation rules, a narrowed-down count of data pieces of the selected static extraction criterion and that of the selected other validation rule (Step S36). For instance, when the other validation rule is selected by the extraction-criteria acquisition unit 12A, the narrow-down estimation unit 13A retrieves aspects and values to be checked against XBRL data pieces from static extraction criteria in common between the validation rule and the other validation rule. The narrow-down estimation unit 13A reads out the distribution information 22c associated with the retrieved aspects and values from the analysis result 22 and sets the read-out distribution information 22c as estimated narrowed-down counts associated with the extraction criteria. The narrow-down estimation unit 13A sets a smallest one of the estimated narrowed-down counts as an estimated narrowed-down count of the extraction group. The narrow-down estimation unit 13A reads out the distribution information 22c associated with the remaining static extraction criterion other than the extraction group from the analysis result 22 and sets the read-out distribution information 22c as an estimated narrowed-down count. On the other hand, when the other validation rule is not selected by the extraction-criteria acquisition unit 12A, the narrow-down estimation unit 13A reads out the distribution information 22c associated with the static extraction criteria and sets the read-out distribution information 22c as estimated narrowed-down counts.

The application-sequence determining unit 14A determines an application sequence of the extraction criteria for each of the validation rules (Step S37). A procedure for an application-sequence determining process will be described below.

The data extraction unit 15A extracts XBRL data pieces from the input data 9 by applying the extraction criteria to the input data 9 in accordance with the determined application sequence (Step S38). When the extraction group is applied first at this time, the data extraction unit 15A stores a result of applying the extraction group (extraction result). When the extraction group has already been applied in another validation rule, a result of applying the extraction group has been stored. Hence, the data extraction unit 15A acquires the stored application result as an extraction result. Put another way, the data extraction unit 15A reuses a result of extraction obtained using the grouped extraction group in a plurality of validation rules.

[Procedure for Application-Sequence Determining Process]

Figure 17:
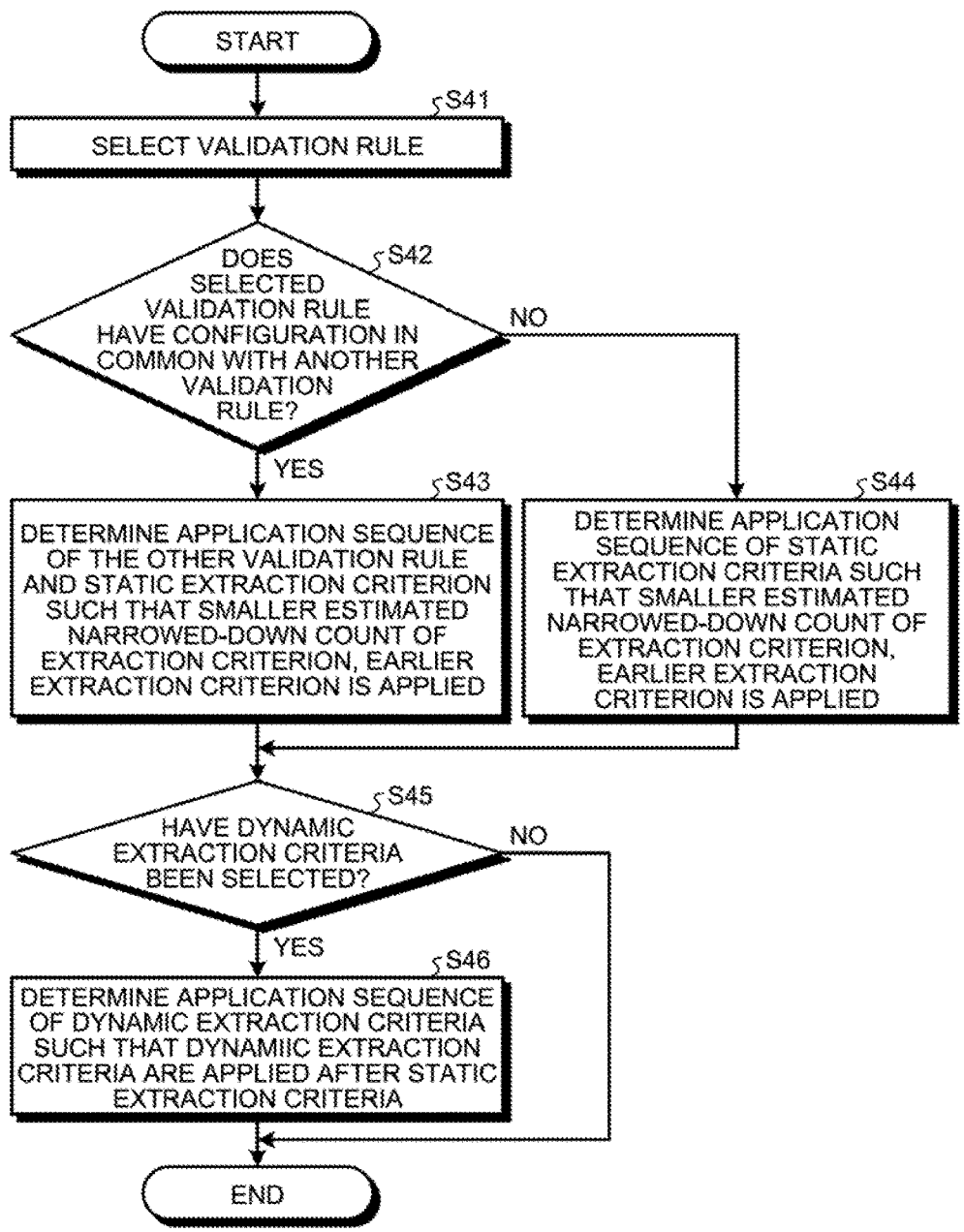
FIG. 17 is a diagram illustrating an example of a flowchart for an application-sequence determining process according to the second embodiment.

Next, a procedure for the application-sequence determining process according to the second embodiment is described below with reference to FIG. 17. FIG. 17 is a diagram illustrating an example of a flowchart for the application-sequence determining process according to the second embodiment.

The application-sequence determining unit 14A selects one validation rule (Step S41).

The application-sequence determining unit 14A determines whether the selected validation rule has a configuration in common with another validation rule (Step S42). Specifically, the application-sequence determining unit 14A determines whether the selected validation rule embraces another validation rule. Upon determining that the selected validation rule has a configuration in common with another validation rule (Yes at Step S42), the application-sequence determining unit 14A determines an application sequence of common static extraction criteria of the other validation rule and a static extraction criterion such that the smaller the estimated narrowed-down count of an extraction criterion, the earlier the extraction criterion is applied (Step S43). The application-sequence determining unit 14 moves to Step S45.

On the other hand, upon determining that the selected validation rule does not have a configuration in common with another validation rule (No at Step S42), the application-sequence determining unit 14A determines an application sequence of static extraction criteria such that the smaller the estimated narrowed-down count of an extraction criterion, the earlier the extraction criterion is applied (Step S44). The application-sequence determining unit 14 moves to Step S45.

At Step S45, the application-sequence determining unit 14A determines whether the extraction-criteria acquisition unit 12A has acquired dynamic extraction criteria (Step S45). Upon determining that dynamic extraction criteria have been acquired (Yes at Step S45), the application-sequence determining unit 14A determines an application sequence of the dynamic extraction criteria such that the dynamic extraction criteria are applied after the static extraction criteria are applied (Step S46). The application-sequence determining unit 14A completes the process.

On the other hand, upon determining that dynamic extraction criteria have not been acquired (No at Step S45), because the application sequence of the static extraction criteria has been determined, the application-sequence determining unit 14A completes the process.

[Advantageous Effects of Second Embodiment]

Thus, in the second embodiment, the extraction apparatus 1 refers to group information about an extraction group, into which a plurality of extraction criteria common to a plurality of validation rules is grouped, and distribution information. The extraction apparatus 1 determines an application sequence of a plurality of extraction criteria of the extraction group and a remaining static extraction criterion other than the extraction group based on an estimated narrowed-down count calculated for each of extraction groups included in the validation rule. The above-described configuration allows the extraction apparatus 1 to calculate an estimated narrowed-down count of the grouped extraction group only once and reuse the estimated narrowed-down count. Hence, the extraction apparatus 1 can determine an application sequence of the plurality of extraction criteria in each of the validation rules early. Furthermore, the extraction apparatus 1 can reuse a result of a process of extracting XBRL data pieces from the input data 9 using the grouped extraction group by performing the extraction process only once.

Hence, the extraction apparatus 1 can extract the XBRL data pieces from the input data 9 early in each of the validation rules.

In the second embodiment described above, when one validation rule includes a plurality of extraction groups, the extraction apparatus 1 determines an extraction group to be used in determination of the application sequence based on the estimated narrowed-down counts. This configuration allows the extraction apparatus 1 to determine the application sequence of the static extraction criteria efficiently by determining an extraction group whose estimated narrowed-down count is small.

In the second embodiment described above, the extraction apparatus 1 determines the extraction group in response to updating of the distribution information that is updated in response to updating of the plurality of XBRL data pieces. This configuration allows the extraction apparatus 1 to optimize application of the extraction criteria depending on characteristics of the XBRL data pieces.

In the second embodiment described above, the extraction apparatus 1 performs an extraction process using a combination of the plurality of extraction criteria of the extraction group and the remaining extraction criterion other than the extraction group in accordance with the application sequence determined by the application-sequence determining process. The extraction apparatus 1 stores a result of extraction extracted using the plurality of extraction criteria of the extraction group. This configuration allows the extraction apparatus 1 to, by storing the extraction result of the extraction group, reuse the stored extraction result in a validation rule having the same extraction group. As a result, the extraction apparatus 1 can perform the extraction process in each of the validation rules early.

[Program and the Like]

The extraction apparatus 1 can be implemented by an information processing apparatus, such as a known personal computer or workstation, equipped with functions of the above-described control unit 10, the storage unit 20, and the like.

Each of the elements of the illustrated extraction apparatus 1 is not always physically configured as illustrated in the drawings. Specifically, specific forms of disintegration and integration of the extraction apparatus 1 are not limited to those illustrated in the drawings, and all or a part of the elements may be functionally or physically disintegrated or integrated in desired units depending on various loads and a usage condition. For instance, the narrow-down estimation unit 13 and the application-sequence determining unit 14 may be integrated into a single unit. The extraction-criteria acquisition unit 12 may be disintegrated into a first acquisition unit that acquires static extraction criteria and a second acquisition unit that acquires dynamic extraction criteria. The extraction-criteria acquisition unit 12A may be disintegrated into a first acquisition unit that acquires static extraction criteria, a second acquisition unit that acquires dynamic extraction criteria, and a third acquisition unit that selects an extraction group and a remaining static extraction criterion other than the extraction group. The storage unit 20 of the validation rule 21, the analysis result 22, and the like may be connected to the extraction apparatus 1 via a network as an external device.

Figure 18:
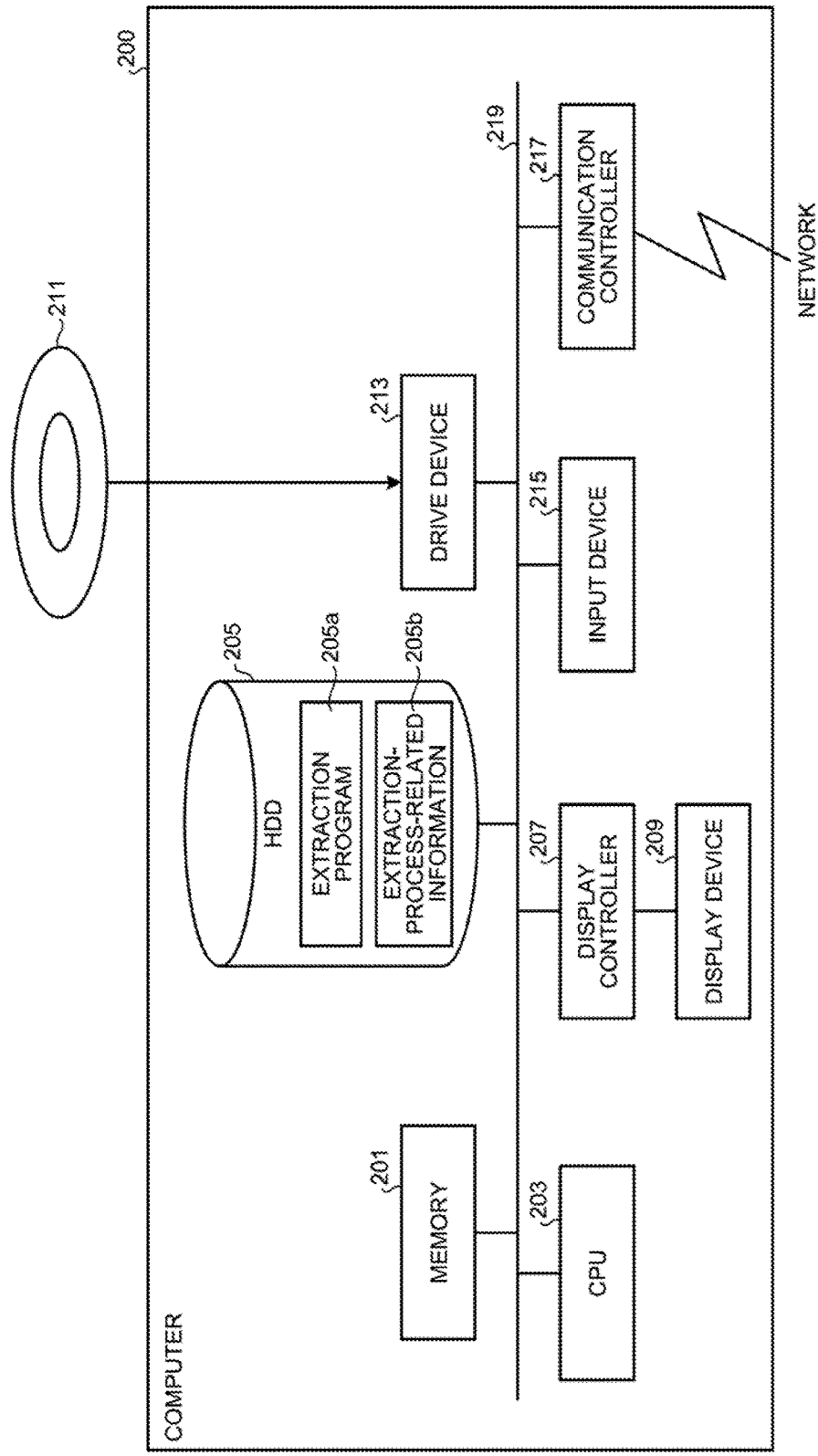
FIG. 18 is a diagram describing an example of a computer that executes an extraction program.

Various processing described above in the embodiments can be implemented by executing a program prepared in advance on a computer, such as a personal computer or a work station. An example of a computer that executes an extraction program that implements functions similar to those of the extraction apparatus 1 illustrated in FIG. 1 is described below. FIG. 18 is a diagram describing an example of the computer that executes the extraction program.

As illustrated in FIG. 18, a computer 200 includes a CPU 203 that executes various computing processing, an input device 215 that receives data input by a user, and a display controller 207 that controls a display device 209. The computer 200 further includes a drive device 213 that reads out a program and the like from a storage medium and a communication controller 217 that transmits and receives data to and from another computer via a network. The computer 200 further includes a memory 201 that temporarily stores various information and an HDD (Hard disk drive) 205. The memory 201, the CPU 203, the HDD 205, the display controller 207, the drive device 213, the input device 215, and the communication controller 217 are connected via a bus 219.

The drive device 213 is a device for a removable disk 211, for instance. The HDD 205 stores an extraction program 205a and extraction-process-related information 205b.

The CPU 203 reads out the extraction program 205a, loads the extraction program 205a in the memory 201, and executes the extraction program 205a as processes. The processes correspond to functional units of the extraction apparatus 1. The extraction-process-related information 205b corresponds to the validation rule 21, the analysis result 22, and the like. For instance, the removable disk 211 stores various information, such as the extraction program 205a.

The extraction program 205a is not always stored in the HDD 205 in advance. For instance, the program may alternatively be stored in a "portable physical medium", such as a flexible disk (FD), a CD-ROM (compact disk read-only memory), a DVD (digital video disc) disc, a magneto-optical disk, or an IC (integrated circuit) card, to be inserted into the computer 200. In that case, the computer 200 may preferably be configured to read out the extraction program 205a from the medium and execute the extraction program 205a.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

According to one aspect, XBRL data pieces containing data items to be validated against a validation rule can be extracted from input data rapidly.

What is claimed is:

1. A non-transitory computer-readable recording medium having stored therein an extraction program that causes a computer to execute a process comprising:

receiving a plurality of validation rules, from input data on a plurality of XBRL files, the plurality of validation rules including extraction criteria directly specifying an element and an aspect of each of the XBRL files; and determining a process sequence of an extraction process based on the plurality of validation rules by referring to distribution information containing distribution of values of individual aspects of a plurality of elements that are individually provided by the plurality of XBRL files and combination information about combination of the extraction criteria that is included individually in the plurality of validation rules, wherein the determining includes determining the process sequence of common extraction criteria and individual extraction criteria based on estimated distribution values calculated for the common extraction criteria and estimated distribution values calculated for the individual extraction criteria, the common extraction criteria being extraction criteria common in any of the plurality of validation rules and the individual extraction criteria being extraction criteria not common among the plurality of validation rules.

2. The non-transitory computer-readable recording medium according to claim 1, the process further including performing the extraction process using a combination of the common extraction criteria and individual extraction criteria in accordance with the process sequence determined at the determining of the process sequence, and
storing a result of the extraction.

3. The non-transitory computer-readable recording medium according to claim 1, wherein the determining includes determining the common extraction criteria and individual extraction criteria in response to updating of the distribution information corresponding to updating of the plurality of XBRL files.

4. An extraction apparatus comprising:
a processor;
a memory, wherein the processor executes a process comprising:
receiving a plurality of validation rules, from input data on a plurality of XBRL files, the plurality of validation rules including extraction criteria directly specifying an element and an aspect of each of the XBRL files; and
determining a process sequence of an extraction process based on the plurality of validation rules by referring to distribution information containing distribution of values of individual aspects of a plurality of elements that are individually provided by the plurality of XBRL files and combination information about combination of the extraction criteria that is contained individually in the plurality of validation rules, wherein the determining includes determining the process sequence of common extraction criteria and individual extraction criteria based on estimated distribution values calculated for the common extraction criteria and estimated distribution values calculated for the individual extraction criteria, the common extraction criteria being extraction criteria common in any of the plurality of validation rules and the individual extraction criteria being extraction criteria not common among the plurality of validation rules.

5. A extraction method to be implemented by a computer, the method comprising:
receiving a plurality of validation rules, from input data on a plurality of XBRL files, the plurality of validation rules including extraction criteria directly specifying an element and an aspect of each of the XBRL files using a processor; and
determining a process sequence of an extraction process based on the plurality of validation rules by referring to distribution information containing distribution of values of individual aspects of a plurality of elements that are individually provided by the plurality of XBRL files and combination information about combination of the extraction criteria that is contained individually in the plurality of validation rules using the processor, wherein the determining includes determining the process sequence of common extraction criteria and individual extraction criteria based on estimated distribution values calculated for the common extraction criteria and estimated distribution values calculated for the individual extraction criteria, the common extraction criteria being extraction criteria common in any of the plurality of validation rules and the individual extraction criteria being extraction criteria not common among the plurality of validation rules.

* * * * *